(12) United States Patent
Fujikawa

(10) Patent No.: US 12,066,093 B2
(45) Date of Patent: Aug. 20, 2024

(54) POWER TRANSMISSION DEVICE

(71) Applicant: JATCO Ltd, Fuji (JP)

(72) Inventor: Masumi Fujikawa, Sagamihara (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 18/042,061

(22) PCT Filed: Sep. 8, 2021

(86) PCT No.: PCT/JP2021/032965
§ 371 (c)(1),
(2) Date: Feb. 17, 2023

(87) PCT Pub. No.: WO2022/074995
PCT Pub. Date: Apr. 14, 2022

(65) Prior Publication Data
US 2024/0026963 A1  Jan. 25, 2024

(30) Foreign Application Priority Data
Oct. 7, 2020 (JP) ................. 2020-169856

(51) Int. Cl.
*F16H 57/04* (2010.01)
*F16H 37/08* (2006.01)
*F16H 57/02* (2012.01)

(52) U.S. Cl.
CPC ..... *F16H 57/0404* (2013.01); *F16H 57/0436* (2013.01); *F16H 57/045* (2013.01); *F16H 57/0486* (2013.01); *F16H 37/082* (2013.01); *F16H 57/02* (2013.01); *F16H 2057/02034* (2013.01); *F16H 2057/02052* (2013.01)

(58) Field of Classification Search
CPC ............ F16H 57/0404; F16H 57/0436; F16H 57/045; F16H 57/0486; F16H 57/02; F16H 2057/02034; F16H 2057/02052; F16H 37/082
See application file for complete search history.

(56) References Cited

U.S. PATENT DOCUMENTS

| 2009/0127954 A1* | 5/2009 | Mogi | .................. F16H 57/0476 310/90 |
| 2011/0050014 A1 | 3/2011 | Mogi | |
| 2011/0203898 A1* | 8/2011 | Harashima | ............. H02K 7/116 475/160 |
| 2013/0119793 A1* | 5/2013 | Hofkirchner | .......... H02K 5/203 310/54 |

(Continued)

FOREIGN PATENT DOCUMENTS

| JP | S54-163419 U | 11/1979 |
| JP | 2008-185078 A | 8/2008 |

(Continued)

OTHER PUBLICATIONS

Machine translation of WO 2013050182 A1 (Year: 2013).*

*Primary Examiner* — Jacob S. Scott
*Assistant Examiner* — Farhana Pervin
(74) *Attorney, Agent, or Firm* — Foley & Lardner LLP

(57) ABSTRACT

A power transmission device, includes a motor; a gear mechanism connected downstream of the motor; a pump that sucks oil through a pump inlet; and a box that includes a first chamber accommodating the gear mechanism and a second chamber provided with the pump inlet.

14 Claims, 18 Drawing Sheets

(56) References Cited

U.S. PATENT DOCUMENTS

| | | | | |
|---|---|---|---|---|
| 2013/0153338 A1* | 6/2013 | Yamauchi | ............... | H02K 9/19 |
| | | | | 184/26 |
| 2013/0192400 A1* | 8/2013 | Dodo | ................... | F16H 37/082 |
| | | | | 74/421 A |
| 2014/0262675 A1* | 9/2014 | Sugiyama | ........... | F16H 57/0483 |
| | | | | 192/85.01 |
| 2016/0223070 A1* | 8/2016 | Kito | ................... | F16H 57/0441 |

FOREIGN PATENT DOCUMENTS

| | | | |
|---|---|---|---|
| JP | 2009-121549 A | 6/2009 | |
| JP | 2012-082930 A | 4/2012 | |
| JP | 2019-152320 A | 9/2019 | |
| JP | 2020-085026 A | 6/2020 | |
| WO | WO-2013/050182 A1 | 4/2013 | |
| WO | WO-2020/071462 A1 | 4/2020 | |

* cited by examiner

POWER TRANSMISSION DEVICE

TECHNICAL FIELD

The present invention relates to a power transmission device.

BACKGROUND ART

Patent Literature 1 discloses a power transmission device for an electric vehicle. The power transmission device includes a gear mechanism (a planetary reduction gear and a differential mechanism).

A strainer that filters oil to be supplied to the gear mechanism and supplies the oil to an oil pump is disposed on an outer peripheral side (an outer side in the radial direction) of the gear mechanism.

CITATION LIST

Patent Literature

Patent Literature 1: JP2019-152320A

SUMMARY OF INVENTION

As the gear mechanism rotates, the oil on the outer peripheral side of the gear mechanism is scraped up, and the amount of oil near a suction port of the strainer may decrease. When the oil pump sucks oil when the amount of the oil near the suction port decreases, air may be sucked.

In the power transmission device, it is required to reduce the air suction of the oil pump.

A power transmission device, includes:
a motor;
a gear mechanism connected downstream of the motor;
a pump that sucks oil through a pump inlet; and
a box that includes a first chamber accommodating the gear mechanism and a second chamber provided with the pump inlet.

According to one aspect of the present invention, it is possible to reduce the air suction of the oil pump.

DESCRIPTION OF EMBODIMENTS

Figure 1:
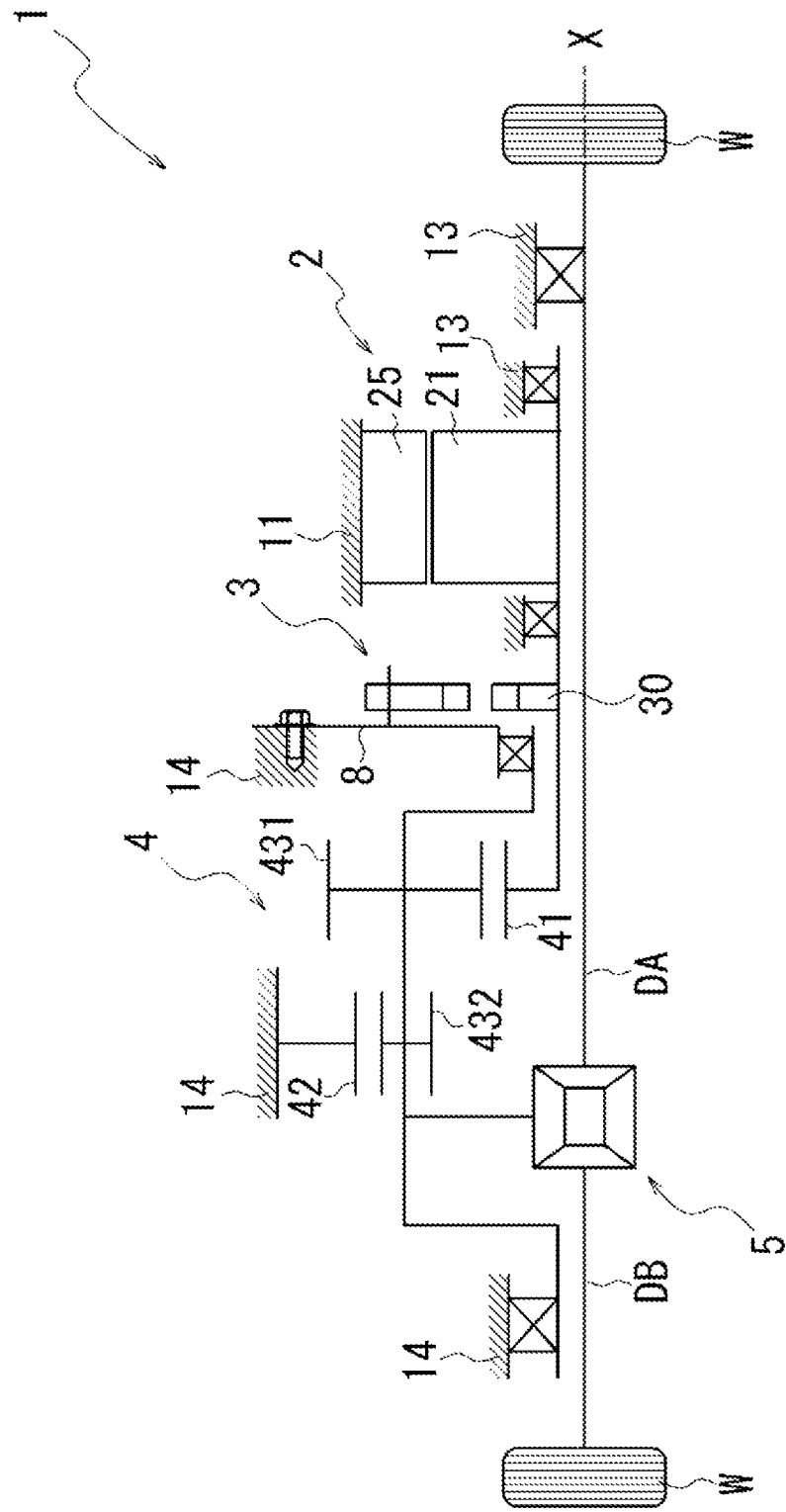
FIG. 1 is a skeleton diagram of a power transmission device according to an embodiment.

Hereinafter, a power transmission device according to an embodiment of the present invention.

In the following description, when referring to a second element (member, portion, or the like) connected to a first element (member, portion, or the like), a second element (member, portion, or the like) connected downstream of a first element (member, portion, or the like), or a second element (member, portion, or the like) connected upstream of a first element (member, portion, or the like), it is meant that the first element and the second element are connected to each other in a power-transmissible manner. A power input side is upstream, and a power output side is downstream. The first element and the second element may be connected to each other via another element (a clutch, other gear mechanisms, or the like).

"Overlapping when viewed from a predetermined direction" means that a plurality of elements are arranged in a predetermined direction, and has the same meaning as "overlapping in a predetermined direction". The "predetermined direction" is, for example, an axial direction, a radial direction, a gravitational direction, or a vehicle running direction (vehicle forward direction, vehicle rearward direction).

If a drawing shows that a plurality of elements (member, portion, or the like) are arranged in a predetermined direction, it can be considered that in explanation of the description, there is a sentence explaining that the plurality of elements overlap when viewed from the predetermined direction.

"Not overlapping when viewed from a predetermined direction" and "offset when viewed from a predetermined direction" mean that a plurality of elements are not arranged in a predetermined direction, and has the same meaning as "not overlapping in a predetermined direction" and "offset in a predetermined direction". The "predetermined direction" is, for example, an axial direction, a radial direction, a gravitational direction, or a vehicle running direction (vehicle forward direction, vehicle rearward direction).

If a drawing shows that a plurality of elements (member, portion, or the like) are not arranged in a predetermined direction, it can be considered that in explanation of the description, there is a sentence explaining that the plurality of elements do not overlap when viewed from the predetermined direction.

"When viewed from a predetermined direction, a first element (member, portion, or the like) is positioned between a second element (member, portion, or the like) and a third element (member, portion, or the like)" means that the first element can be observed to be between the second element and the third element. The "predetermined direction" is, for example, an axial direction, a radial direction, a gravitational direction, or a vehicle running direction (vehicle forward direction, vehicle rearward direction).

For example, when the second element, the first element, and the third element are arranged in this order along the axial direction, it can be said that the first element is positioned between the second element and the third element when viewed from the radial direction. If a drawing shows that a first element is between a second element and a third element when viewed from a predetermined direction, it can be considered that in explanation of the description, there is a sentence explaining that the first element is between the second element and the third element.

When two elements (member, portion, or the like) overlap when viewed from the axial direction, the two elements are coaxial.

The "axial direction" means an axial direction of a rotation axis of a member that constitutes the power transmission device. The "radial direction" means a direction orthogonal to the rotation axis of the member that constitutes the power transmission device. The member is, for example, a motor, a gear mechanism, or a differential gear mechanism.

FIG. 1 is a skeleton diagram illustrating the power transmission device 1 according to the present embodiment.

Figure 2:
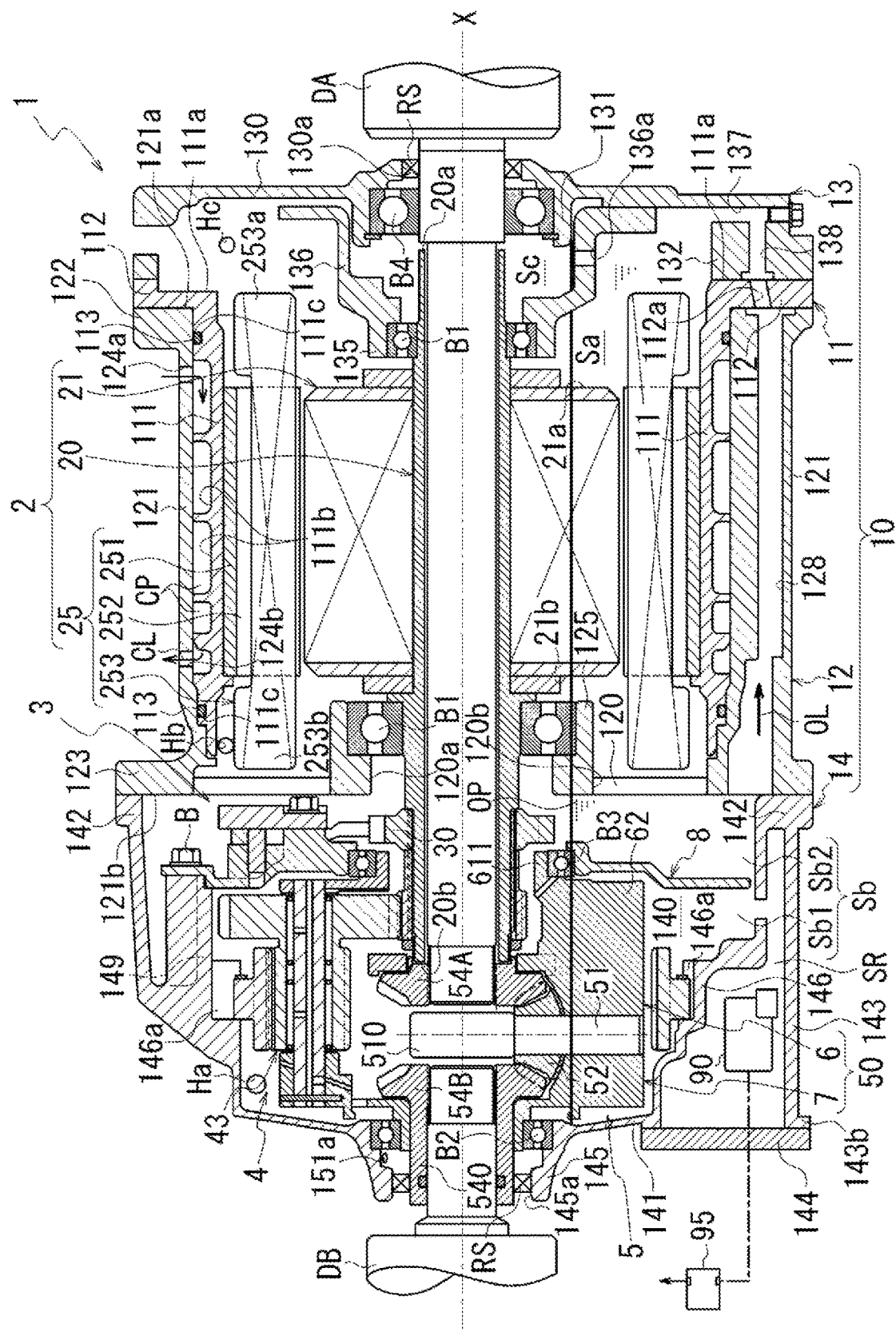
FIG. 2 is a schematic cross-sectional view of the power transmission device.

FIG. 2 is a schematic cross-sectional view illustrating the power transmission device 1 according to the present embodiment.

Figure 3:
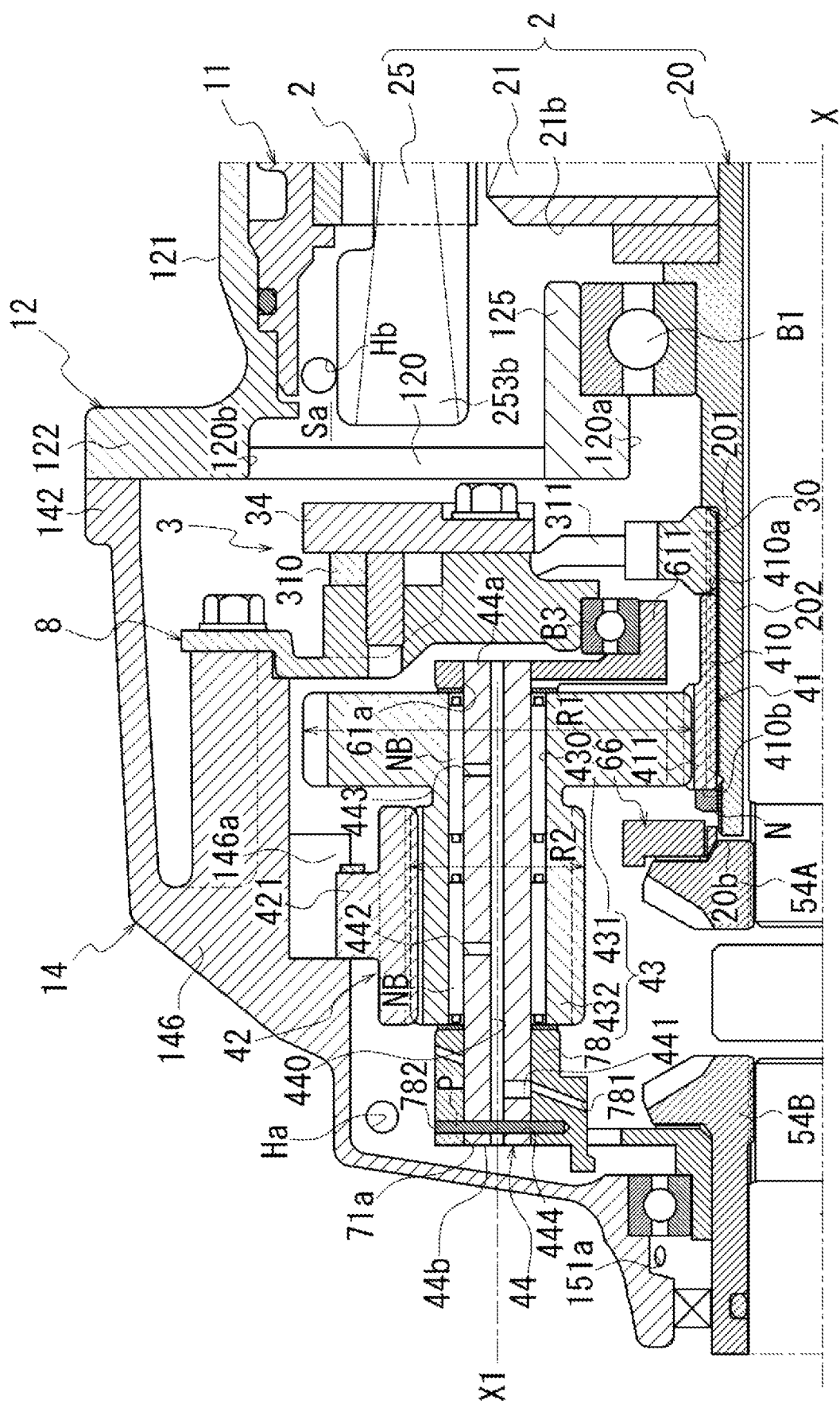
FIG. 3 is an enlarged view around a planetary reduction gear of the power transmission device.

FIG. 3 is an enlarged view around a planetary reduction gear 4 of the power transmission device 1.

Figure 4:
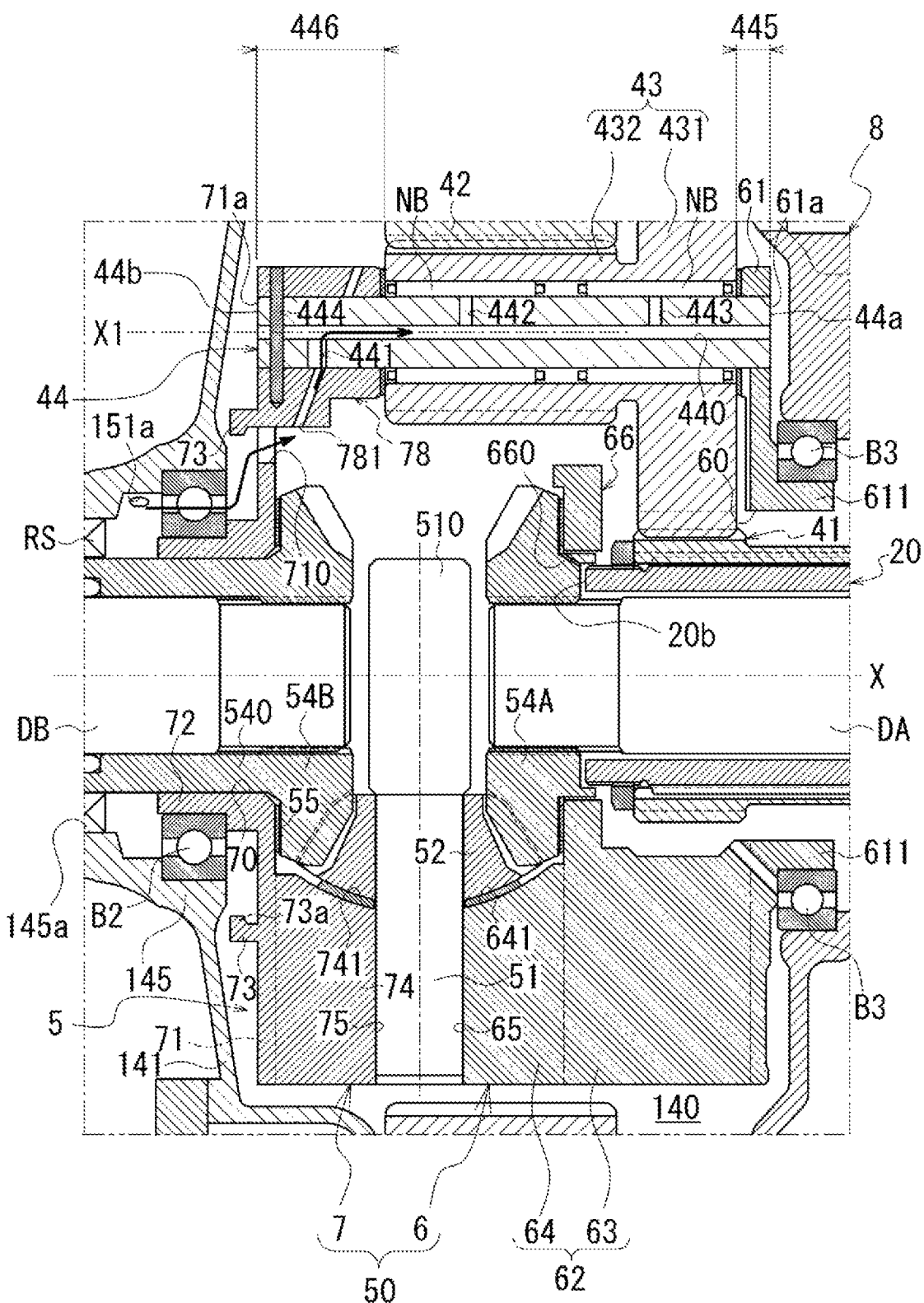
FIG. 4 is an enlarged view around a differential mechanism of the power transmission device.

FIG. 4 is an enlarged view around a differential mechanism 5 of the power transmission device 1.

As shown in FIG. 1, a power transmission device 1 includes a motor 2, a planetary reduction gear 4 (reduction mechanism) that decelerates output rotation of the motor 2 and then inputs the decelerated output rotation to a differential mechanism 5 (differential gear), drive shafts DA and DB, and a park lock mechanism 3.

In the power transmission device 1, the park lock mechanism 3, the planetary reduction gear 4, the differential mechanism 5, and the drive shafts DA and DB (drive shaft) are arranged along a transmission path of the output rotation of the motor 2 around the rotation axis X. The planetary reduction gear 4 and the differential mechanism 5 constitute a gear mechanism.

In the power transmission device 1, the output rotation of the motor 2 is decelerated by the planetary reduction gear 4 and then input to the differential mechanism 5, and then transmitted through the drive shafts DA and DB to left and right driving wheels W and W of a vehicle on which the power transmission device 1 is mounted.

Here, the planetary reduction gear 4 is connected downstream of the motor 2, the differential mechanism 5 is connected downstream of the planetary reduction gear 4, and the drive shafts DA and DB are connected downstream of the differential mechanism 5.

As shown in FIG. 2, a main body box 10 (box) of the power transmission device 1 includes a first box 11 that accommodates the motor 2 and a second box 12 that is externally inserted into the first box 11. The main body box 10 includes a third box 13 assembled to the first box 11 and a fourth box 14 assembled to the second box 12.

The first box 11 includes a cylindrical support wall portion 111, and a flange-like joint portion 112 formed at one end 111a of the support wall portion 111.

The first box 11 is disposed with the support wall portion 111 oriented along a rotation axis X of the motor 2, and the motor 2 is accommodated on an inner side of the support wall portion 111.

The joint portion 112 is provided in a direction orthogonal to the rotation axis X and formed with an outer diameter larger than that of the support wall portion 111.

The second box 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 is formed with an inner diameter that allows the peripheral wall portion 121 to be externally inserted into the support wall portion 111 of the first box 11.

The first box 11 and the second box 12 are assembled to each other such that the peripheral wall portion 121 of the second box 12 is externally inserted into the support wall portion 111 of the first box 11.

The joint portion 122 on the one end 121a side of the peripheral wall portion 121 comes into contact with the joint portion 112 of the first box 11 from the rotation axis X direction. These joint portions 122 and 112 are connected to each other by bolts (not shown).

In the first box 11, a plurality of grooves 111b are provided on an outer periphery of the support wall portion 111. The plurality of grooves 111b are provided at intervals in the rotation axis X direction. The grooves 111b are provided over an entire circumference in a circumferential direction around the rotation axis X.

The peripheral wall portion 121 of the second box 12 is externally inserted into the support wall portion 111 of the first box 11. The peripheral wall portion 121 closes openings of the grooves 111b. A plurality of cooling paths CP through which a coolant CL flows are formed between the support wall portion 111 and the peripheral wall portion 121.

The peripheral wall portion 121 is provided with an inlet 124a for the coolant CL on the joint portion 122 side, and an outlet 124b for the coolant CL on the joint portion 123 side. The inlet 124a and the outlet 124b are holes penetrating the peripheral wall portion 121 in the radial direction of the rotation axis X, and are connected to pipes (not shown) through which the coolant CL flows. The coolant CL is circulated through a pipe (not shown) provided inside the vehicle by a water pump (not shown). The coolant CL is introduced into the cooling path CP from the inlet 124a, and cools oil OL inside a motor chamber Sa, which will be described later.

Ring grooves 111c and 111c are formed on both sides of a region in which the concave grooves 111b are provided on an outer periphery of the support wall portion 111 of the first box 11. Seal rings 113 and 113 are externally fitted to the ring grooves 111c and 111c.

These seal rings 113 are pressed against an inner periphery of the peripheral wall portion 121 that is externally inserted to the support wall portion 111 to seal a gap between the outer periphery of the support wall portion 111 and the inner periphery of the peripheral wall portion 121.

A beam portion 120 extending toward an inner diameter side from the joint portion 123 is provided at the other end 121b of the second box 12. The beam portion 120 is oriented in a direction orthogonal to the rotation axis X. An opening 120a through which the drive shaft DA is inserted is provided in a region of the beam portion 120 that intersects with the rotation axis X.

A tubular motor support portion 125 surrounding the opening 120a is provided on a surface of the beam portion 120 on the motor 2 side (on the right side in the drawing).

The motor support portion 125 is inserted inside a coil end 253b, which will be described later. The motor support portion 125 faces an end portion 21b of a rotor core 21 with a gap in the rotation axis X direction.

A bearing B1 is supported on an inner periphery of the motor support portion 125. An outer periphery of a motor shaft 20 is supported by the motor support portion 125 via the bearing B1.

A plurality of openings 120b extending in the radial direction of the rotation axis X are formed between the motor support portion 125 and the joint portion 123. The plurality of openings 120b are provided at intervals in a circumferential direction of the rotation axis X. The second box 12 and the fourth box 14 internally communicate with each other through the openings 120b.

In FIG. 2, a vertical direction with respect to a mounting state of the power transmission device 1 on the vehicle is illustrated as an up-down direction in the drawing. A lower region in the vertical direction of the peripheral wall portion 121 of the second box 12 has a larger thickness in the radial direction than that of an upper region.

An oil reservoir portion 128 is provided on the region having the larger thickness in the radial direction, penetrating in the rotation axis X direction.

The oil reservoir portion 128 communicates with an axial oil passage 138 provided in a joint portion 132 of the third box 13 via a communication hole 112a provided in the joint portion 112 of the first box 11.

The third box 13 includes a wall portion 130 orthogonal to the rotation axis X. The joint portion 132 having a ring shape when viewed from the rotation axis X direction is provided on an outer peripheral portion of the wall portion 130.

As viewed from the first box 11, the third box 13 is positioned on a side opposite to the differential mechanism 5 (on the right side in the drawing). The joint portion 132 of the third box 13 is joined to the joint portion 112 of the first box 11 from the rotation axis X direction. The third box 13 and the first box 11 are connected to each other with bolts (not shown). In this state, the third box 13 closes the opening on the joint portion 122 side (the right side in the drawing) of the support wall portion 111 of the first box 11.

In the third box 13, an insertion hole 130a for the drive shaft DA is provided in a central portion of the wall portion 130.

A lip seal RS is fixed to an inner periphery of the insertion hole 130a. The lip seal RS brings a lip portion (not shown) into elastic contact with an outer periphery of the drive shaft DA. A gap between the inner periphery of the insertion hole 130a and the outer periphery of the drive shaft DA is sealed with the lip seal RS.

A peripheral wall portion 131 surrounding the insertion hole 130a is provided on a surface of the wall portion 130 on the first box 11 side (the left side in the drawing). The drive shaft DA is supported on the inner periphery of the peripheral wall portion 131 via a bearing B4.

A motor support portion 135 is disposed on the motor 2 side (the left side in the drawing) when viewed from the peripheral wall portion 131. The motor support portion 135 has a tubular shape surrounding the rotation axis X with a gap therebetween.

A cylindrical connection wall 136 is connected to an outer periphery of the motor support portion 135. The connection wall 136 is formed with a larger outer diameter than the peripheral wall portion 131 on the wall portion 130 side (the right side in the drawing). The connection wall 136 is provided along the rotation axis X in a direction away from the motor 2. The connection wall 136 connects the motor support portion 135 to the wall portion 130 of the third box 13.

The motor support portion 135 is supported by the third box 13 via the connection wall 136. One end 20a side of the motor shaft 20 penetrates an inner side of the motor support portion 135 from the motor 2 side to the peripheral wall portion 131 side.

The bearing B1 is supported on an inner periphery of the motor support portion 135. An outer periphery of the motor shaft 20 is supported by the motor support portion 135 via the bearing B1.

The connection wall 136 is provided with an opening 136a. A space (internal space Sc) surrounded by the connection wall 136 communicates with the motor chamber Sa, which will be described later, through this opening 136a.

The fourth box 14 includes a peripheral wall portion 141 surrounding the outer periphery of the planetary reduction gear 4 and the differential mechanism 5, and a flange-shaped joint portion 142 formed on an end portion of the peripheral wall portion 141 on the second box 12 side.

The fourth box 14 is positioned on the differential mechanism 5 side (the left side in the drawing) when viewed from the second box 12. The joint portion 142 of the fourth box 14 is joined to the joint portion 123 of the second box 12 from the rotation axis X direction. The fourth box 14 and the second box 12 are connected to each other with bolts (not shown).

Inside the main body box 10 of the power transmission device 1, the motor chamber Sa that accommodates the motor 2 and a gear chamber Sb (first chamber) that accommodates the planetary reduction gear 4 and the differential mechanism 5 are formed.

The motor chamber Sa is formed within the first box 11 between the beam portion 120 of the second box 12 and the wall portion 130 of the third box 13.

The gear chamber Sb is formed within the fourth box 14 and between the beam portion 120 of the second box 12 and the peripheral wall portion 141 of the fourth box 14. The motor chamber Sa and the gear chamber Sb communicate with each other through the opening 120b of the beam portion 120. The main body box 10 contains the oil OL for lubricating the motor 2, the planetary reduction gear 4, the differential mechanism 5, and the like. As indicated by a thick line in FIG. 2, the motor chamber Sa and the gear chamber Sb are provided with an oil storage portion OP that stores the oil OL. The oil OL in the oil storage portion OP can also flow into the internal space Sc through the opening 136a.

A plate member 8 (plate) is provided inside the gear chamber Sb.

The plate member 8 is fixed with bolts B to the fourth box 14.

The plate member 8 divides the gear chamber Sb into a first gear chamber Sb1 that accommodates the planetary reduction gear 4 and the differential mechanism 5, and a second gear chamber Sb2 that accommodates the park lock mechanism 3.

The second gear chamber Sb2 is positioned between the first gear chamber Sb1 and the motor chamber Sa in the rotation axis X direction. The motor chamber Sa and the second gear chamber Sb2 communicate with each other through the opening 120b of the beam portion 120.

The motor 2 includes the motor shaft 20, the rotor core 21 (rotor), and a stator core 25 (stator). The motor shaft 20 is cylindrical. The drive shaft DA is disposed passing through the inner periphery of the motor shaft 20. The rotor core 21 is cylindrical and is externally inserted into the motor shaft 20. The stator core 25 surrounds the outer periphery of the rotor core 21 with a gap therebetween.

In the motor shaft 20, the bearings B1 and B1 are externally inserted and fixed to both sides of the rotor core 21, respectively.

The bearing B1 positioned on the one end 20a side (the right side in the drawing) of the motor shaft 20 when viewed from the rotor core 21 is supported on the inner periphery of the motor support portion 135 of the third box 13. The bearing B1 positioned on the other end 20b side is supported on the inner periphery of the cylindrical motor support portion 125 of the second box 12.

The motor support portions 135 and 125 are respectively disposed facing the one end portion 21a and the other end portion 21b of the rotor core 21, with a gap in the rotation axis X direction therebetween, on the inner diameter side of the coil ends 253a and 253b, which will be described later.

The rotor core 21 is formed by laminating a plurality of silicon steel plates. Each of the silicon steel plates is externally inserted into the motor shaft 20 in a state where relative rotation thereof with the motor shaft 20 is restricted.

The silicon steel plate has a ring shape when viewed from the rotation axis X direction of the motor shaft 20. N-pole and S-pole magnets (not shown) are provided alternately in a circumferential direction around the rotation axis X on the outer peripheral side of the silicon steel plate.

The stator core 25 surrounding the outer periphery of the rotor core 21 is formed by laminating a plurality of electromagnetic steel plates. The stator core 25 is fixed to the inner periphery of the cylindrical support wall portion 111 of the first box 11.

Each of the electromagnetic steel plates includes a yoke portion 251, a teeth portion 252, and a coil 253. The yoke portion 251 is ring-shaped and fixed to the inner periphery of the support wall portion 111. The teeth portion 252 protrudes from the inner periphery of the yoke portion 251 toward the rotor core 21 side.

According to the present invention, the coil 253 is formed by winding a wire (not shown) over a plurality of the teeth portions 252. A known copper wire or the like can be used as the wire that forms the coil 253. Note that the coil 253 may have a configuration in which the wire is distributedly wound around each of the plurality of teeth portions 252 protruding toward the rotor core 21 side, or may have a configuration in which the wire is concentratedly wound.

In the stator core 25, a length in the rotation axis X direction of the coil 253 is set to be longer than that of the rotor core 21. In the stator core 25, coil ends 253a and 253b positioned at both end portions of the coil 253 in the rotation axis X direction protrude from the rotor core 21 in the rotation axis X direction. The coil ends 253a and 253b have a symmetrical shape with the teeth portions 252 interposed therebetween.

The other end 20b side of the motor shaft 20 passes through the opening 120a provided in the beam portion 120 (motor support portion 125) of the second box 12 to the differential mechanism 5 side (the left side in the drawing) and is positioned inside the fourth box 14.

The other end 20b of the motor shaft 20 faces a side gear 54A, which will be described later, inside the fourth box 14 with a gap in the rotation axis X direction therebetween.

As shown in FIG. 3, in the motor shaft 20, a stepped portion 201 is provided in a region positioned inside the fourth box 14. In the motor shaft a region from the stepped portion 201 to the vicinity of the other end 20b serves as a fitting portion 202 provided with a spline on an outer periphery thereof.

A park gear 30 of the park lock mechanism 3 and a sun gear 41 are spline-fitted to an outer periphery of the fitting portion 202.

One side surface of the park gear 30 in the rotation axis X direction is in contact with the stepped portion 201. One end 410a of a cylindrical base portion 410 of the sun gear 41 is in contact with the other side surface of the park gear 30 in the rotation axis X direction.

A nut N screwed onto the other end 20b of the motor shaft 20 is pressed against the other end 410b of the base portion 410 from the rotation axis X direction.

The sun gear 41 and the park gear 30 are interposed between the nut N and the stepped portion 201 so as not to rotate relative to the motor shaft 20.

The sun gear 41 includes a teeth portion 411 on the outer periphery of the motor shaft 20 on the other end 20b side. A large-diameter gear portion 431 of a stepped pinion gear 43 meshes with an outer periphery of the teeth portion 411.

The stepped pinion gear 43 includes the large-diameter gear portion 431 that meshes with the sun gear 41 and a small-diameter gear portion 432 having a smaller diameter than the large-diameter gear portion 431.

The stepped pinion gear 43 is a gear component in which the large-diameter gear portion 431 and the small-diameter gear portion 432 are arranged in an axis line X1 direction parallel to the rotation axis X and integrally provided.

The large-diameter gear portion 431 is formed with an outer diameter R1 larger than an outer diameter R2 of the small-diameter gear portion 432.

The stepped pinion gear 43 is oriented along the axis line X1. The large-diameter gear portion 431 of the stepped pinion gear 43 is positioned on the motor 2 side (the right side in the drawing).

An outer periphery of the small-diameter gear portion 432 meshes with an inner periphery of a ring gear 42. The ring gear 42 has a ring shape surrounding the rotation axis X with a gap therebetween. A plurality of engaging teeth 421 protruding outward in the radial direction are provided on an outer periphery of the ring gear 42. The plurality of engaging teeth 421 are provided around the rotation axis X in the circumferential direction at intervals.

The engaging teeth 421 provided on the outer periphery of the ring gear 42 are spline-fitted to teeth portions 146a provided on a support wall portion 146 of the fourth box 14. Rotation of the ring gear 42 around the rotation axis X is restricted.

The stepped pinion gear 43 includes a through hole 430 penetrating inner diameter sides of the large-diameter gear portion 431 and the small-diameter gear portion 432 in the axis line X1 direction.

The stepped pinion gear 43 is rotatably supported via needle bearings NB and NB on an outer periphery of a pinion shaft 44 passing through the through hole 430.

As shown in FIG. 4, an in-shaft oil passage 440 is provided inside the pinion shaft 44. The in-shaft oil passage 440 penetrates from one end 44a of the pinion shaft 44 to the other end 44b along the axis line X1.

The pinion shaft 44 is provided with oil holes 442 and 443 that allow the in-shaft oil passage 440 and the outer periphery of the pinion shaft 44 to communicate with each other.

Furthermore, the pinion shaft 44 is provided with an introduction passage 441 for introducing the oil OL into the in-shaft oil passage 440.

The introduction passage 441 communicates with an in-case oil passage 781 formed in a base portion 71 of a second case portion 7, which will be described later.

The oil OL scraped up by a differential case 50, which will be described later, flows into the in-case oil passage 781. The oil OL that moves to the outer diameter side in the radial direction due to a centrifugal force generated by rotation of the differential case 50 flows into the in-case oil passage 781.

The oil OL that flows from the in-case oil passage 781 into the introduction passage 441 flows into the in-shaft oil passage 440 of the pinion shaft 44. The oil OL that flows into the in-shaft oil passage 440 is discharged outward in the radial direction through the oil holes 442 and 443. The oil OL discharged from the oil holes 442 and 443 lubricates the needle bearing NB externally inserted into the pinion shaft 44.

The pinion shaft 44 is provided with a through hole 444 on the other end 44b side with respect to a region where the introduction passage 441 is provided. The through hole 444 penetrates the pinion shaft 44 in a diametrical direction.

The pinion shaft 44 is provided such that the through hole 444 and an insertion hole 782 on the second case portion 7 side, which will be described later, are aligned with each other around the axis line X1 in phase. A positioning pin P inserted into the insertion hole 782 passes through the through hole 444 of the pinion shaft 44. As a result, the pinion shaft 44 is supported on the second case portion 7 side while rotation thereof around the axis line X1 is restricted.

As shown in FIG. 4, on the one end 44a side in a longitudinal direction of the pinion shaft 44, a region that protrudes from the stepped pinion gear 43 serves as a first shaft portion 445. The first shaft portion 445 is supported by a support hole 61a provided in a first case portion 6 of the differential case 50.

On the other end 44b side in the longitudinal direction of the pinion shaft 44, a region that protrudes from the stepped pinion gear 43 serves as a second shaft portion 446. The second shaft portion 446 is supported by a support hole 71a provided in a second case portion 7 of the differential case 50. Here, the first shaft portion 445 means a region on the one end 44a side of the pinion shaft 44 where the stepped pinion gear 43 is not externally inserted. The second shaft portion 446 means a region on the other end 44b side of the pinion shaft 44 where the stepped pinion gear 43 is not externally inserted.

A length of the second shaft portion 446 of the pinion shaft 44 in the axis line X1 direction is longer than a length of the first shaft portion 445 in the axis line X1 direction.

A main configuration of the differential mechanism 5 will be described below.

Figure 5:
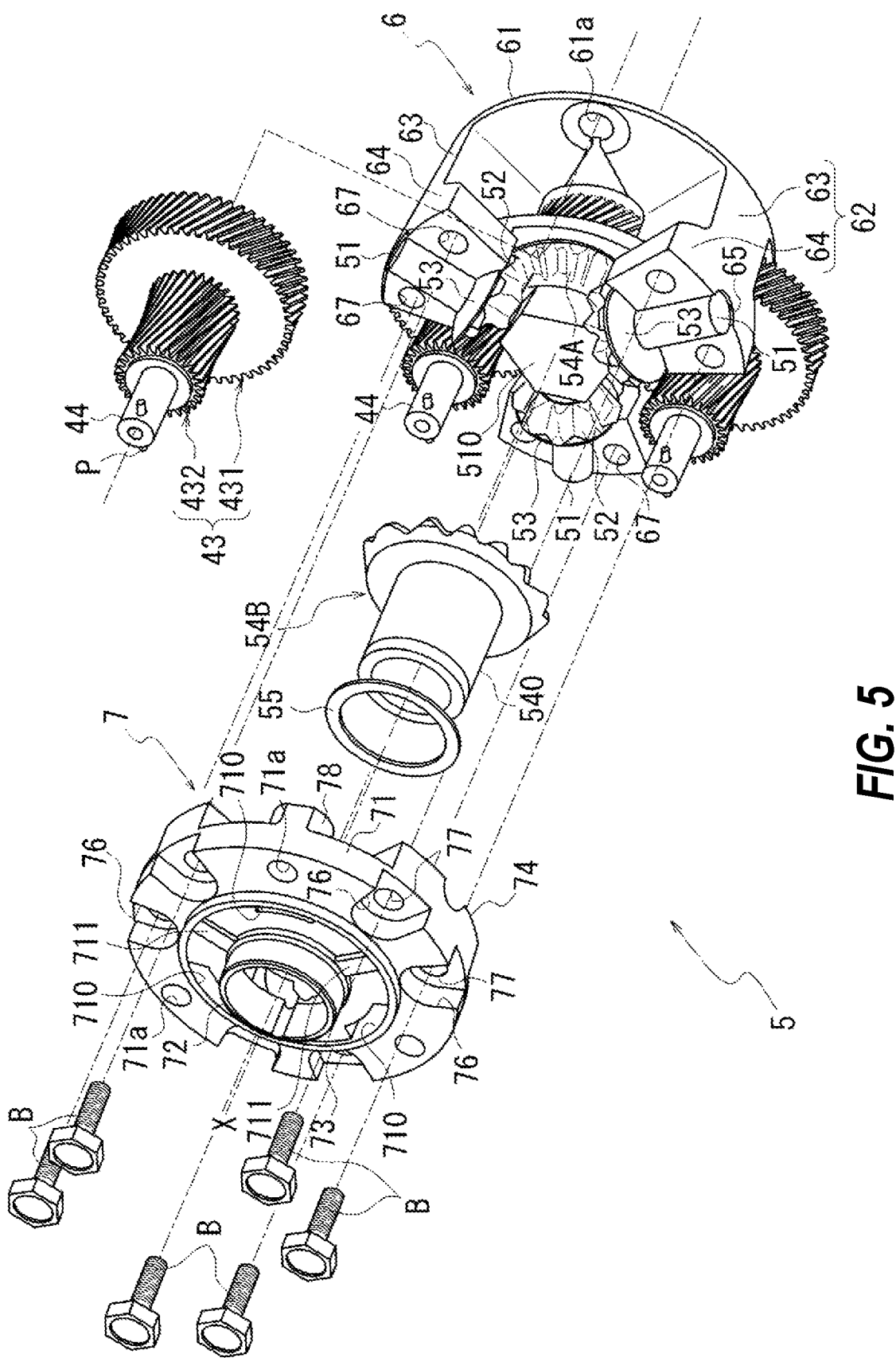
FIG. 5 is an exploded perspective view of the differential mechanism of the power transmission device.

FIG. 5 is an exploded perspective view of the differential mechanism 5.

As shown in FIGS. 4 and 5, the differential case 50 of the differential mechanism 5 is formed by assembling the first case portion 6 and the second case portion 7 in the rotation axis X direction. In the present embodiment, the first case portion 6 and the second case portion 7 of the differential case 50 function as carriers that support the pinion shaft 44 of the planetary reduction gear 4.

Three pinion mate gears 52 and three pinion mate shafts 51 are provided between the first case portion 6 and the second case portion 7 of the differential case 50. The pinion mate shaft 51 functions as a support shaft that supports the pinion mate gear 52.

The pinion mate shafts 51 are provided at equal intervals in the circumferential direction around the rotation axis X. An end portion on the inner diameter side of each of the pinion mate shafts 51 is connected to a common connecting portion 510 with each other.

The pinion mate gears 52 are externally inserted into the pinion mate shafts 51, respectively. Each of the pinion mate gears 52 is in contact with the connecting portion 510 from an outer side of the rotation axis X in the radial direction.

In this state, the pinion mate gears 52 are rotatably supported by the pinion mate shafts 51, respectively.

As shown in FIG. 4, in the differential case 50, a side gear 54A is positioned on one side of the connecting portion 510 in the rotation axis X direction, and a side gear 54B is positioned on the other side. The side gear 54A is rotatably supported by a first case portion 6. The side gear 54B is rotatably supported by the second case portion 7.

The side gear 54A meshes with a pinion mate gear 52 from one side in the rotation axis X direction. The side gear 54B meshes with the pinion mate gear 52 from the other side in the rotation axis X direction.

The first case portion 6 includes a ring-shaped base portion 61. An opening 60 is provided in a central portion of the base portion 61. A cylindrical wall portion 611 surrounding the opening 60 is provided on a surface of the base portion 61 opposite to the second case portion 7 (the right side in the drawing). An outer periphery of the cylindrical wall portion 611 is supported by the plate member 8 via a bearing B3.

As shown in FIG. 5, a surface of the base portion 61 on the second case portion 7 side is provided with three connecting beams 62 extending toward the second case portion 7 side.

The connecting beams 62 are provided at equal intervals in the circumferential direction around the rotation axis X. The connecting beam 62 includes a base portion 63 orthogonal to the base portion 61 and a connecting portion 64 wider than the base portion 63.

As shown in FIG. 4, a support groove 65 for supporting the pinion mate shaft 51 is provided on a tip surface of the connecting portion 64.

An arc portion 641 is formed along an outer periphery of the pinion mate gear 52 on the inner diameter side (the rotation axis X side) of the connecting portion 64.

The arc portion 641 supports the outer periphery of the pinion mate gear 52.

A gear support portion 66 is connected to a boundary portion between the base portion 63 and the connecting portion 64 of the connecting beam 62. The gear support portion 66 is oriented in a direction orthogonal to the rotation axis X. The gear support portion 66 includes a through hole 660 in a central portion thereof. This through hole 660 is externally inserted into a tubular wall 541 of the side gear 54A.

The base portion 61 is provided with a support hole 61a. The one end 44a of the pinion shaft 44 is externally inserted into the support hole 61a.

The second case portion 7 includes a ring-shaped base portion 71.

A through hole 70 penetrating through the base portion 71 in a thickness direction is provided in a central portion of the base portion 71.

A cylindrical wall portion 72 surrounding the through hole 70 and a peripheral wall portion 73 surrounding the cylindrical wall portion 72 with a gap therebetween are provided on a surface of the base portion 71 opposite to the first case portion 6 (the left side in the drawing).

Slits 710 that penetrate the base portion 71 in the thickness direction are provided on an inner diameter side of the peripheral wall portion 73. Between the slits 710 and 710 adjacent to each other in the circumferential direction around the rotation axis, a protruding wall 711 is provided. The protruding wall 711 extends linearly in the radial direction of the rotation axis X. The protruding wall 711 is provided straddling the peripheral wall portion 73 on the outer diameter side and the cylindrical wall portion 72 on the inner diameter side.

On an outer diameter side of the peripheral wall portion 73, between the support holes 71a and 71a adjacent to each other in the circumferential direction around the rotation axis X, bolt accommodating portions 76 and 76 recessed toward a back side of paper surface are provided.

An insertion hole 77 for a bolt is opened inside the bolt accommodating portion 76. The insertion hole 77 penetrates the base portion 71 in the thickness direction (the rotation axis X direction).

Connecting portions 74 protruding toward the first case portion 6 are provided on a surface of the base portion 71 on the first case portion 6 side (the right side in the drawing).

As shown in FIG. 4, a support groove 75 for supporting the pinion mate shaft 51 is provided on a tip surface of the connecting portion 74. An arc portion 741 along the outer periphery of the pinion mate gear 52 is provided on the inner diameter side (the rotation axis X side) of the connecting portion 74. The arc portion 741 supports the outer periphery of the pinion mate gear 52.

As shown in FIG. 5, a cylindrical wall portion 540 is provided on the back surface of the side gear 54B. The washer 55 is externally inserted into the cylindrical wall portion 540. The base portion 71 of the second case portion 7 is provided with a guide portion 78 protruding toward the first case portion 6 (the right side in the drawing).

As shown in FIG. 4, the pinion shaft 44 is inserted into the support hole 71a of the guide portion 78 from the first case portion 6 side in a cross-sectional view along the axis line X1.

In the differential case 50, a bearing B2 is externally inserted into the cylindrical wall portion 72 of the second case portion 7. The bearing B2 externally inserted into the cylindrical wall portion 72 is held by a support portion 145 of the fourth box 14, and the cylindrical wall portion 72 of the differential case 50 is rotatably supported by the fourth box 14 via the bearing B2.

The drive shaft DB passing through an opening portion 145a of the fourth box 14 is inserted into the support portion 145 from the rotation axis X direction. The drive shaft DB is rotatably supported by the support portion 145.

The lip seal RS is fixed to an inner periphery of the opening portion 145a. A lip portion (not shown) of the lip seal RS is in elastic contact with an outer periphery of the cylindrical wall portion 540 of the side gear 54B externally inserted into the drive shaft DB.

As a result, a gap between an outer periphery of the cylindrical wall portion 540 of the side gear 54B and an inner periphery of the opening portion 145a is sealed.

The first case portion 6 of the differential case 50 is supported by the plate member 8 via the bearing B3 externally inserted into the cylindrical wall portion 611.

As shown in FIG. 2, the drive shaft DA passing through the insertion hole 130a of the third box 13 is inserted into the first case portion 6 from the rotation axis direction.

The drive shaft DA is provided across the inner diameter side of the motor shaft 20 of the motor 2 and the sun gear 41 of the planetary reduction gear 4 in the rotation axis X direction.

As shown in FIG. 4, inside the differential case 50, the side gears 54A and 54B are spline-fitted to an outer periphery of a tip portion of the drive shafts DA and DB. The side gears 54A, 54B and the drive shafts DA, DB are connected to each other in a manner of rotating together around the rotation axis X.

In this state, the side gears 54A and 54B are arranged opposite to each other with a gap therebetween in the rotation axis X direction. A connecting portion 510 of the pinion mate shaft 51 is positioned between the side gears 54A and 54B.

As shown in FIG. 5, the pinion mate gear 52 is supported by each of the pinion mate shafts 51. The pinion mate gears 52 are assembled to the side gear 54A positioned on one side in the rotation axis X direction and the side gear 54B positioned on the other side in such a manner that the teeth portions thereof are meshed with each other.

As shown in FIG. 2, when the power transmission device 1 is mounted on the vehicle, a lower portion of the differential case 50 is positioned inside the oil storage portion OP.

In the present embodiment, the oil OL is stored up to a height where the connecting beam 62 is positioned within the oil storage portion OP when the connecting beam 62 is positioned at the lowest position.

The oil OL in the oil storage portion OP is scraped up by the differential case 50 rotating around the rotation axis X when the output rotation of the motor 2 is transmitted.

FIGS. 6 to 11 are diagrams illustrating an oil catch portion 15.

Figure 6:
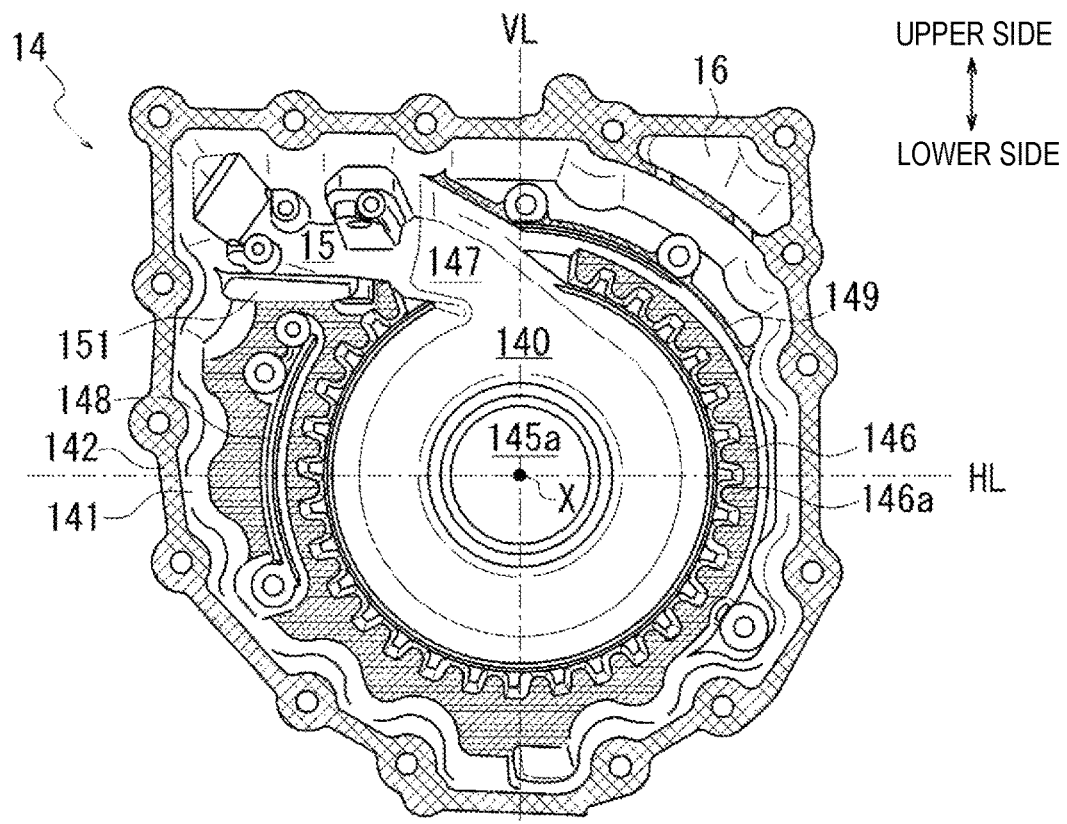
FIG. 6 is a diagram illustrating an oil catch portion.

FIG. 6 is a plan view of the fourth box 14 viewed from the third box 13 side.

Figure 7:
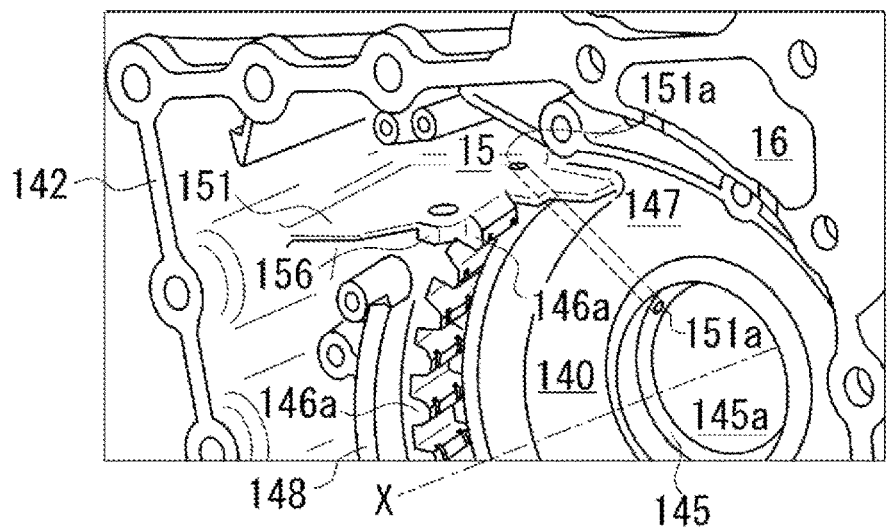
FIG. 7 is a diagram illustrating the oil catch portion.

FIG. 7 is a perspective view of the oil catch portion 15 shown in FIG. 6 as viewed obliquely from above.

Figure 8:
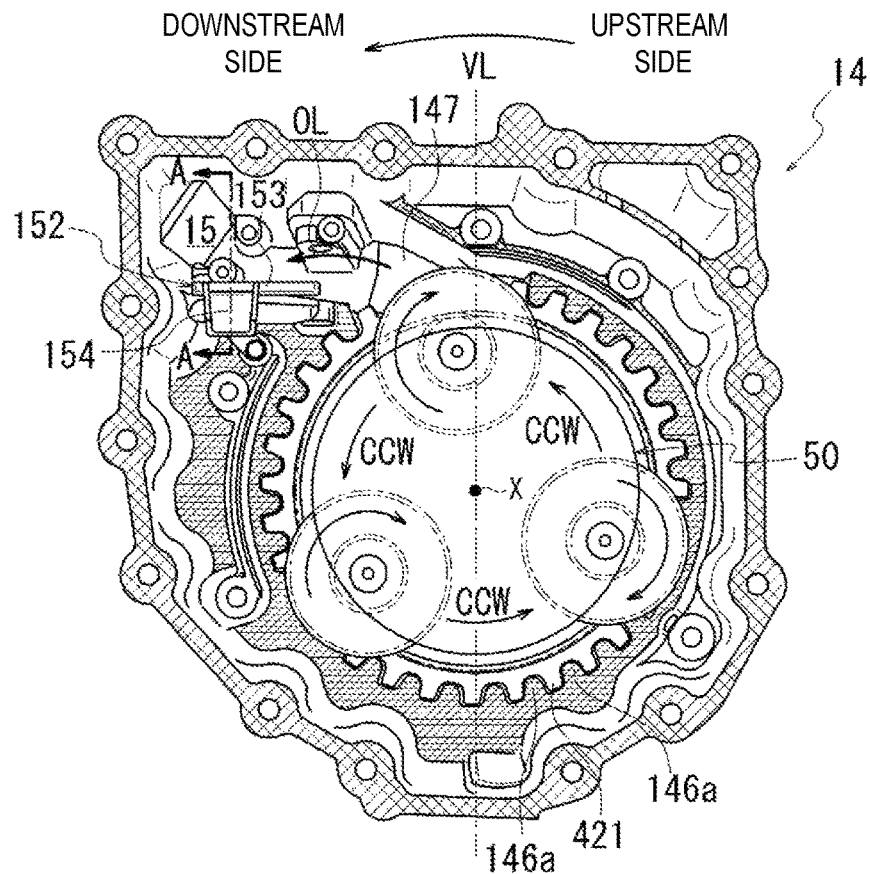
FIG. 8 is a diagram illustrating the oil catch portion.
Figure 9:
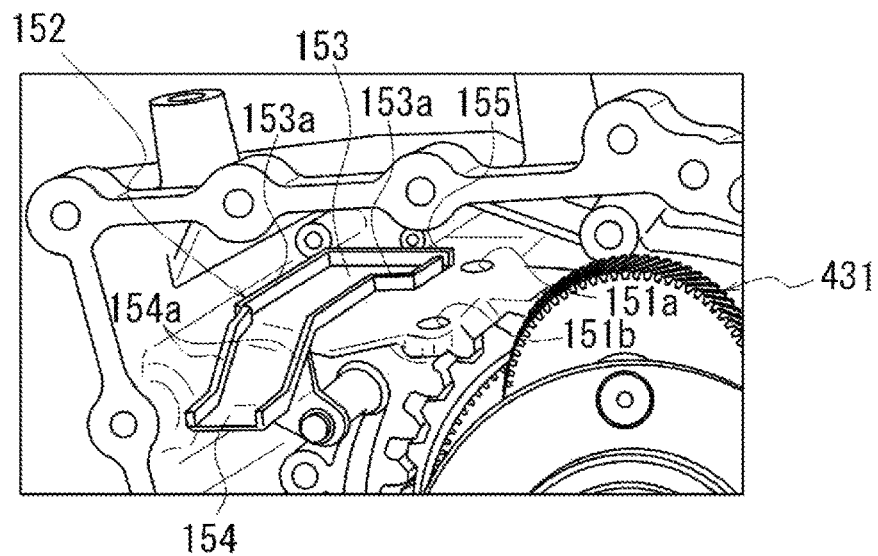
FIG. 9 is a diagram illustrating the oil catch portion.

FIG. 8 is a plan view of the fourth box 14 viewed from the third box 13 side. FIG. 8 shows a state in which the differential case 50 is disposed. FIG. 9 is a perspective view of the oil catch portion 15 shown in FIG. 8 as viewed obliquely from above.

Figure 10:
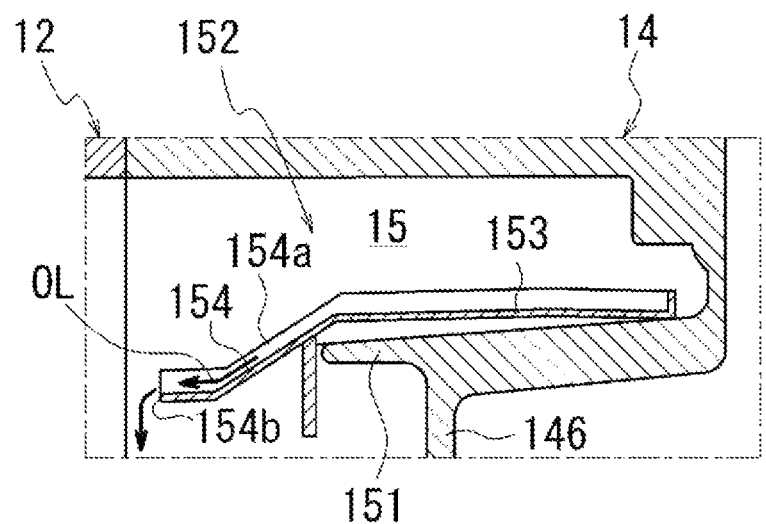
FIG. 10 is a diagram illustrating the oil catch portion.

FIG. 10 is a schematic diagram of an A-A cross section in FIG. 8.

Figure 11:
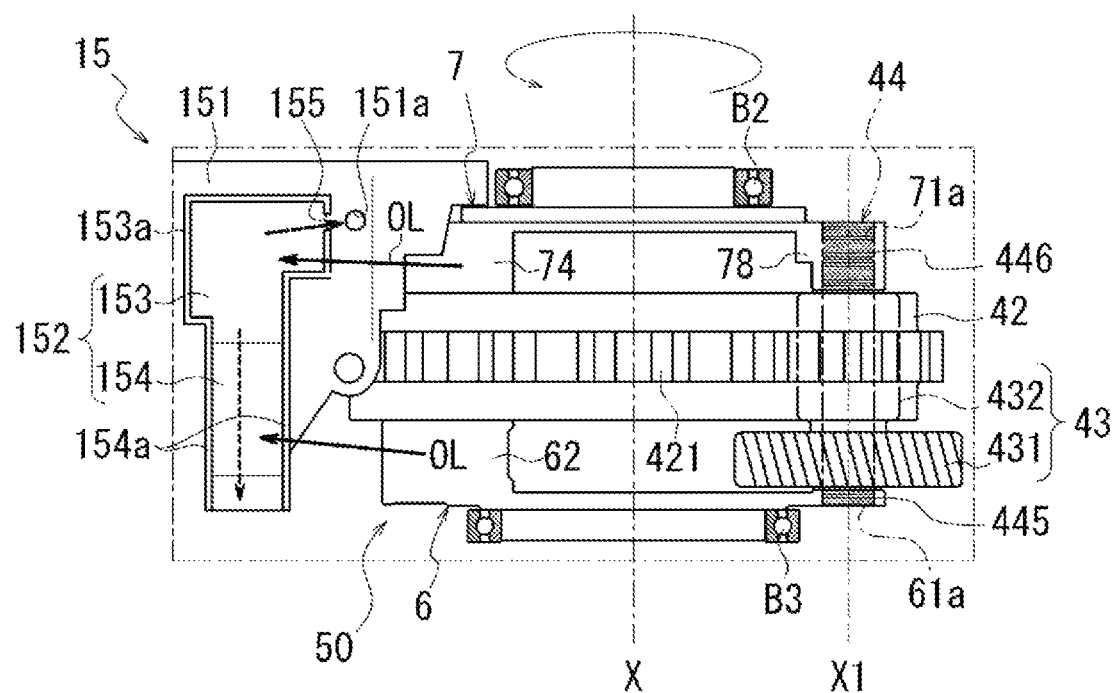
FIG. 11 is a diagram illustrating the oil catch portion.

FIG. 11 is a schematic diagram illustrating a positional relation between the oil catch portion 15 and the differential case 50 (the first case portion 6 and the second case portion 7) when the power transmission device 1 is viewed from above.

Note that in FIGS. 6 and 8, hatching is added to clarify the positions of the joint portion 142 of the fourth box 14 and the support wall portion 146. In FIGS. 6 and 8, illustration of the plate member 8 is omitted.

As shown in FIG. 6, the fourth box 14 is provided with the support wall portion 146 surrounding the central opening portion 145a with a gap therebetween when viewed from the rotation axis X direction. The inner side (rotation axis X) of the support wall portion 146 serves as an accommodation portion 140 of the differential case 50.

A space for the oil catch portion 15 and a space for a breather chamber 16 are formed in an upper portion of the fourth box 14.

The support wall portion 146 of the fourth box 14 is provided with a communication port 147 in a region intersecting with the vertical line VL. The communication port 147 allows the oil catch portion 15 and the accommodation portion 140 of the differential case 50 to communicate with each other.

The oil catch portion 15 and the breather chamber 16 are respectively positioned on one side (the left side in the drawing) and the other side (the right side in the drawing) interposing the vertical line VL orthogonal to the rotation axis X.

The oil catch portion 15 is disposed at a position offset from the vertical line VL passing through a rotation center (rotation axis X) of the differential case 50. When the oil catch portion 15 is viewed from above, the oil catch portion 15 is disposed at a position offset from right above the differential case 50.

Here, the vertical line VL is a vertical line VL based on a state of the power transmission device 1 mounted on the vehicle. The vertical line VL is orthogonal to the rotation axis X when viewed from the rotation axis X direction.

Note that a horizontal line HL in the following explanation is a horizontal line HL based on a state of the power transmission device 1 mounted on the vehicle. The horizontal line HL is orthogonal to the rotation axis X when viewed from the rotation axis X direction.

In FIG. 6, the oil catch portion 15 is formed extending further to the back side of the paper surface than the support wall portion 146.

A support base portion 151 (shelf portion) is provided at a lower edge of the oil catch portion 15 while protruding toward the front side of the paper surface. The support base portion 151 is provided in a range from the support wall portion 146 to the front side of the paper surface and from the joint portion 142 of the fourth box 14 to the back side of the paper surface.

The communication port 147 is provided on the vertical line VL side of the oil catch portion 15 (the right side in the drawing) when viewed from the rotation axis X direction. The communication port 147 is formed by cutting out a part of the support wall portion 146.

The communication port 147 is provided in a range that crosses the vertical line VL from the breather chamber 16 side (the right side in the drawing) to the oil catch portion 15 side (left side in the drawing) when viewed from the rotation axis X direction.

As shown in FIG. 8, in the present embodiment, when the vehicle equipped with the power transmission device 1 travels forward, the differential case 50 rotates in a counterclockwise direction CCW around the rotation axis X as viewed from the third box 13 side.

Therefore, the oil catch portion 15 is positioned downstream of the differential case 50 in a rotational direction. A circumferential width of the communication port 147 is wider on a left side of the vertical line VL than that on a right side. Here, a left side across the vertical line VL of the communication port 147 is a downstream side in a rotational direction of the differential case 50, and the right side thereof is an upstream side. As a result, most of the oil OL scraped up by the differential case 50 rotating around the rotation axis X can flow into the oil catch portion 15.

Furthermore, as shown in FIG. 11, an outer peripheral position of a rotation track of the second shaft portion 446 of the pinion shaft 44 and an outer peripheral position of a rotation track of the large-diameter gear portion 431 are offset with each other in the radial direction of the rotation axis X. The outer peripheral position of the rotation track of the second shaft portion 446 is positioned on the inner diameter side of the outer peripheral position of the rotation track of the large-diameter gear portion 431.

Therefore, the second shaft portion 446 has a spatial margin on the outer diameter side thereof. The oil catch portion 15 is provided using this space, and a space inside the main body box 10 can be effectively used.

As shown in FIG. 11, the second shaft portion 446 protrudes inward of the small-diameter gear portion 432 when viewed from the motor 2. A peripheral member of the second shaft portion 446 (for example, the guide portion 78 of the differential case 50 that supports the second shaft portion 446) is positioned close to the oil catch portion 15.

As a result, the oil OL (lubricating oil) can be smoothly supplied from the peripheral member to the oil catch portion 15.

As shown in FIG. 7, an end portion of the oil hole 151a on an outer diameter side is open inward of the support base portion 151. The oil hole 151a extends inside the fourth box 14 to an inner diameter side. An end portion on the inner diameter side of the oil hole 151a opens to an inner periphery of the support portion 145.

As shown in FIG. 4, the end portion on the inner diameter side of the oil hole 151a in the support portion 145 opens between the lip seal RS and the bearing B2.

As shown in FIGS. 8 and 11, an oil guide 152 is mounted on the support base portion 151.

The oil guide 152 includes a catch portion 153 and a guide portion 154 extending from the catch portion 153 to the first box 11 side (the front side of the paper surface in FIG. 8).

As shown in FIG. 11, when viewed from above, the support base portion 151 is provided at a position on an outer side in the radial direction of the rotation axis X and overlapping a part of the differential case 50 (the first case portion 6 and the second case portion 7), so that interference with the stepped pinion gear 43 (large-diameter gear portion 431) can be avoided.

The catch portion 153 is provided at a position overlapping the second shaft portion 446 of the pinion shaft 44 when viewed from the radial direction of the rotation axis X. Furthermore, the guide portion 154 is provided at a position overlapping the first shaft portion 445 of the pinion shaft 44 and the large-diameter gear portion 431.

Therefore, when the differential case 50 rotates around the rotation axis X, a part of the oil OL that is scraped up by the differential case 50 moves toward the catch portion 153 and the guide portion 154.

A wall portion 153a extending in a direction away from the support base portion 151 (upward) is provided on an outer peripheral edge of the catch portion 153. A part of the oil OL that is scraped up by the differential case 50 that rotates around the rotation axis X is reserved in the oil guide 152.

A notch portion 155 is provided on the wall portion 153a inward of the catch portion 153 (the back side of the paper surface of FIG. 9).

The notch portion 155 is provided in a region facing the oil hole 151a. A part of the oil OL reserved in the catch portion 153 is discharged from the notch portion 155 toward the oil hole 151a.

The guide portion 154 is inclined downward and away from the catch portion 153. Wall portions 154a and 154a are provided on both sides of the guide portion 154 in a width direction. The wall portions 154a and 154a are provided over an entire length of the guide portion 154 in the longitudinal direction. The wall portions 154a and 154a are connected to a wall portion 153a surrounding an outer periphery of the catch portion 153.

A part of the oil OL reserved in the catch portion 153 is also discharged to the guide portion 154 side.

As shown in FIG. 10, the guide portion 154 extends toward the second box 12 at a position that avoids interference with the differential case (see FIG. 2). A tip 154b of the guide portion 154 is positioned above the park lock mechanism 3 (see FIG. 2). As indicated by an arrow in FIG. 10, the oil OL that reaches the tip 154b of the guide portion 154 drops downward and is supplied to the park lock mechanism 3 (see FIG. 2).

As shown in FIG. 2, a radial oil passage 137 is provided between the joint portion 132 and the wall portion 130 of the third box 13. The radial oil passage 137 communicates with the axial oil passage 138 provided inside the joint portion 132.

The axial oil passage 138 communicates with the oil reservoir portion 128 provided in the lower portion of the second box 12 via the communication hole 112a provided in the joint portion 112 of the first box 11.

The oil reservoir portion 128 penetrates the inside of the peripheral wall portion 121 in the rotation axis X direction and communicates with the oil storage portion OP of the motor chamber Sa and the gear chamber Sb.

The disk-shaped plate member 8 is provided in a direction orthogonal to the rotation axis X in the gear chamber Sb. As described above, the plate member 8 divides the gear chamber Sb in the fourth box 14 into the first gear chamber Sb1 on the differential case 50 side and the second gear chamber Sb2 on the motor 2 side.

Figure 12:
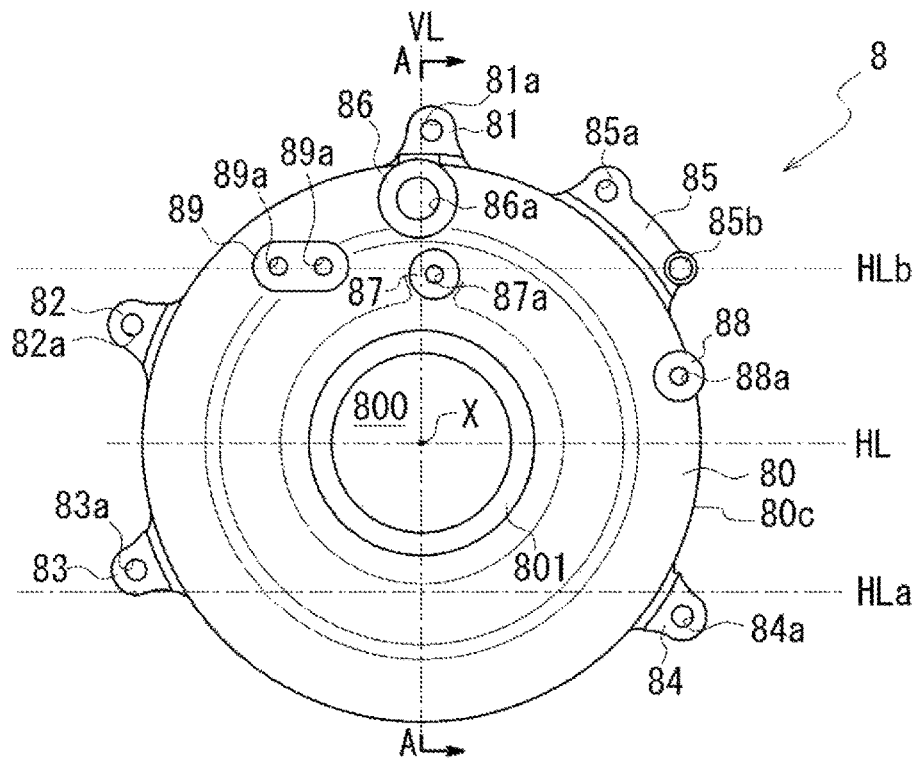
FIG. 12 is a diagram illustrating a plate member.
Figure 13:
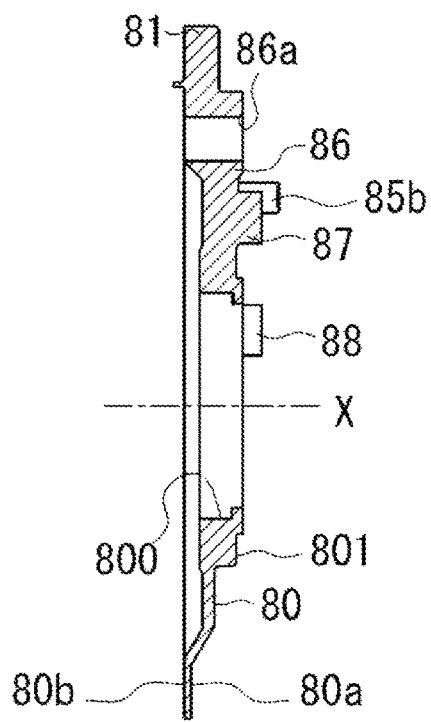
FIG. 13 is a diagram illustrating the plate member.

FIGS. 12 and 13 are diagrams illustrating the plate member 8.

FIG. 12 is a plan view of the plate member 8 viewed from the motor 2 side.

FIG. 13 is a diagram of an A-A cross section in FIG. 12.

As shown in FIG. 13, the plate member 8 includes a surface 80a and a surface 80b. The surface 80b (facing surface) faces the planetary reduction gear 4 and the differential case 50 (see FIG. 2), which constitute the gear mechanism. The opposite surface 80a (back surface) faces the motor 2 (see FIG. 2).

As shown in FIG. 12, the plate member 8 has a ring-shaped base portion 80 when viewed from the motor 2 side. A ring-shaped support portion 801 surrounding a through hole 800 is provided in a central portion of the base portion 80.

As shown in FIG. 12, connecting pieces 81, 82, 83, and 84 are provided on an outer peripheral edge 80c of the base portion 80.

Each of the connecting pieces 81, 82, 83, and 84 extends outward in the radial direction from the outer peripheral edge 80c of the base portion 80. The connecting pieces 81, 82, 83 and 84 are provided with bolt holes 81a, 82a, 83a, and 84a, respectively.

The connecting piece 81 is provided on an upper portion of the plate member 8 at a position that intersects with the vertical line VL. The connecting piece 81 extends away from the base portion 80 along the vertical line VL.

On one side (the left side in FIG. 12) of the vertical line VL, the connecting pieces 82 and 83 are provided on the upper side and the lower side of the horizontal line HL, respectively. These connecting pieces 82 and 83 also extend away from the base portion 80.

The connecting piece 84 is provided on the lower side of the horizontal line HL and on the other side of the vertical line VL (the right side in FIG. 12). On the lower side of the horizontal line HL, the connecting piece 84 protrudes downward from a position that passes through a lower edge of the connecting piece 83 and intersects with a straight line HLa parallel to the horizontal line HL.

The connecting piece 85 is provided on the upper side of the horizontal line HL and on the other side of the vertical line VL (the right side in FIG. 12). The connecting piece 85 is provided in an arc shape having a width in the circumferential direction around the rotation axis X. The bolt hole 85a is provided at a position of the connecting piece 85 near the vertical line VL. A support pin 85b is provided at a position near the horizontal line HL. The support pin 85b protrudes toward a front side of paper surface.

A support boss 86 for a stopper pin 861 (see FIG. 17) is provided on the surface 80a (see FIG. 13) of the plate member 8 on the motor 2 side. The support boss 86 is provided with a hole 86a (see FIG. 12) through which the stopper pin 861 is inserted. The support boss 86 is provided adjacent to the connecting piece 81 below the connecting piece 81 positioned on the vertical line VL.

As shown in FIG. 12, a mounting boss 87 is provided below the support boss 86. The mounting boss 87 is provided at a position that intersects with a straight line HLb that passes through the support pin 85b and is parallel to the horizontal line HL. The mounting boss 87 protrudes further to the front side of paper surface than the support boss 86.

Further, a mounting boss 88 paired with the mounting boss 87 is provided below the support pin 85b in the vertical line VL direction.

A mounting portion 89 for a support 33, which will be described later, is provided on the opposite side (left side in the drawing) of the support pin 85b when viewed from the mounting boss 87.

The mounting portion 89 is provided with two bolt holes 89a and 89a adjacent to each other in the horizontal line direction.

Figure 14:
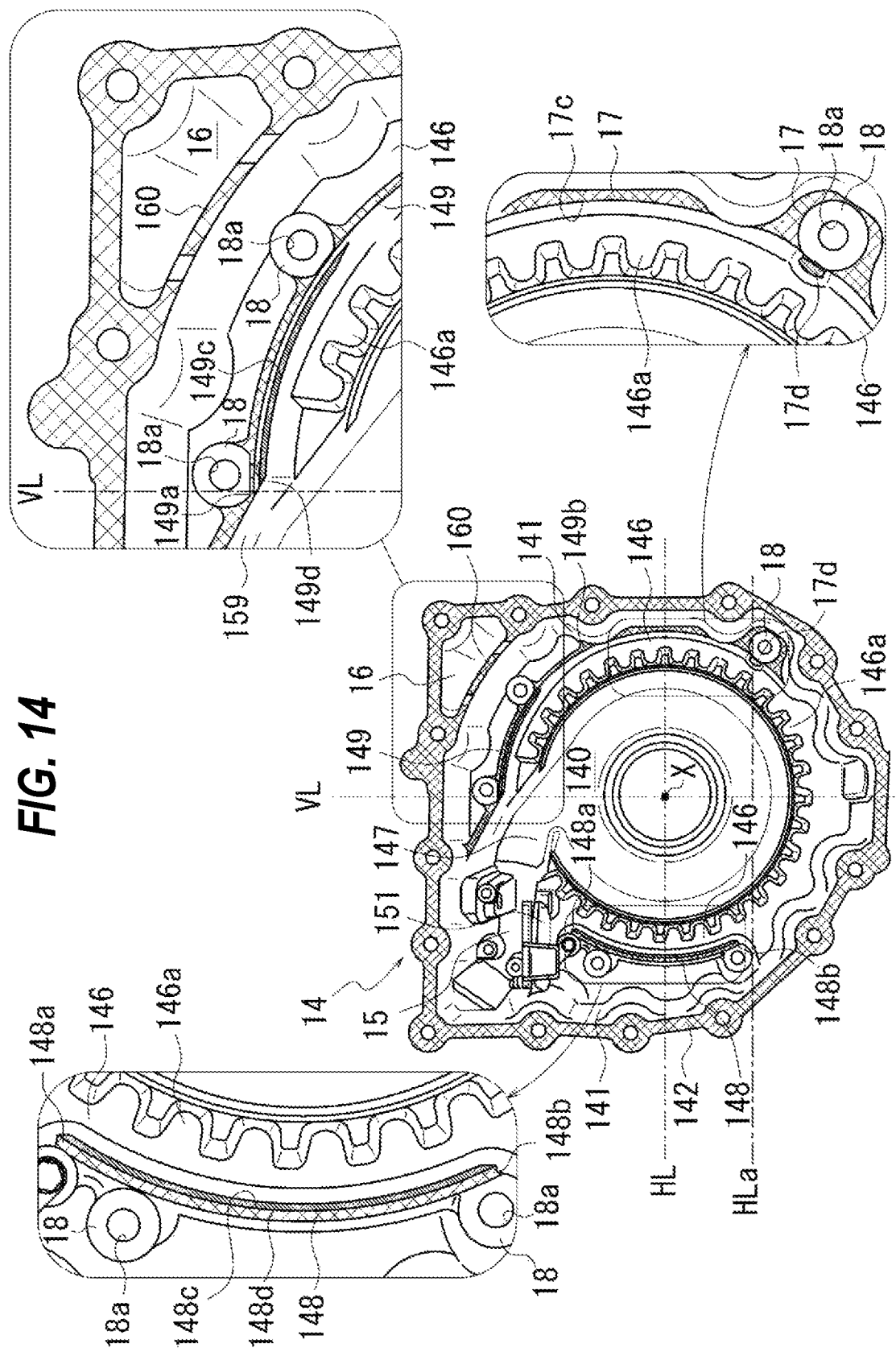
FIG. 14 is a diagram of a fourth box viewed from a motor side.

FIG. 14 is a diagram of the fourth box 14 as viewed from the motor 2 side, and is a diagram illustrating the arrangement of stepped portions 148d, 149d, and 17d that support the outer peripheral edge of the plate member 8.

Note that in FIG. 14, peripheral wall portions 148 and 149 and an arcuate wall portion 17, and the stepped portions 148d, 149d, and 17d are hatched in order to clarify positions thereof.

Figure 15:
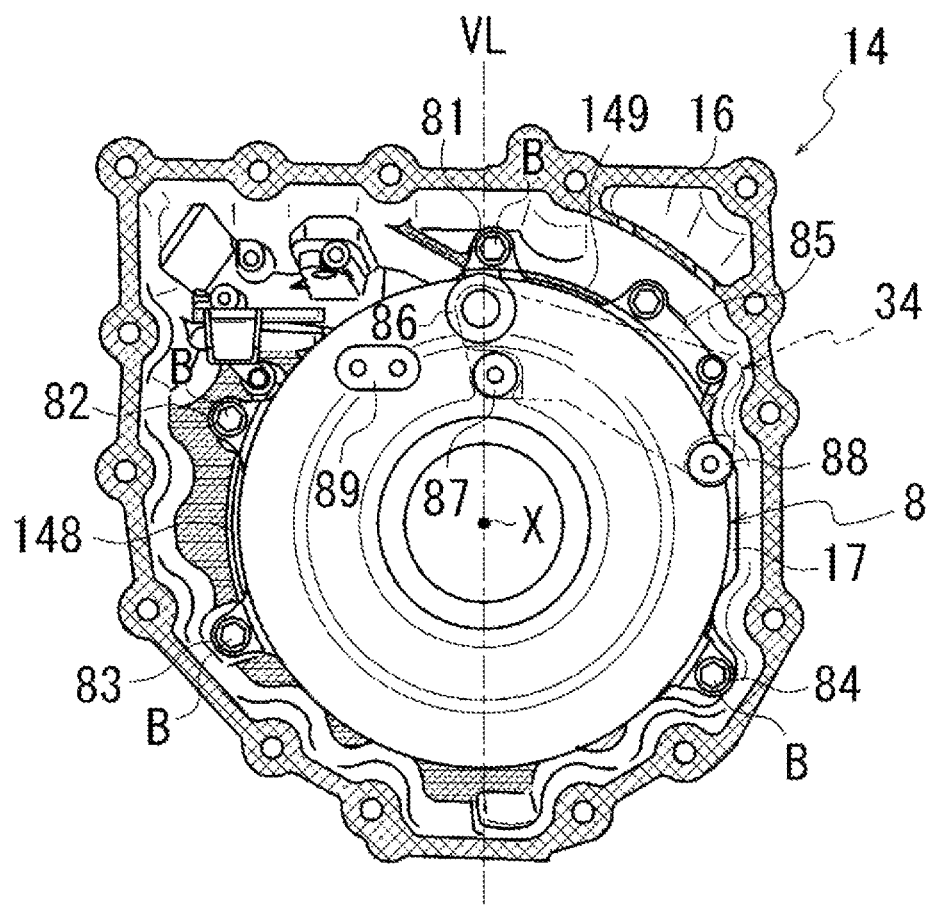
FIG. 15 is a diagram of the fourth box viewed from the motor side.

FIG. 15 is a diagram of the fourth box 14 as seen from the motor 2 side, and is a diagram illustrating a state in which the plate member 8 is attached.

As shown in FIG. 14, the fourth box 14 is provided with the peripheral wall portions 148 and 149 when viewed from the rotation axis X direction. The peripheral wall portions 148 and 149 are provided on an outer diameter side of a region of the support wall portion 146 where the teeth portion 146a is provided.

The peripheral wall portions 148 and 149 are formed in an arc shape around the rotation axis X.

The peripheral wall portion 148 is positioned below the oil catch portion 15 in the vertical line VL direction.

The peripheral wall portion 148 is provided in a range that crosses the horizontal line HL passing through the rotation axis X from the upper side to the lower side when viewed from the rotation axis X direction.

An upper end portion 148a of the peripheral wall portion 148 is positioned near the support base portion 151. A lower end portion 148b of the peripheral wall portion 148 is positioned near the straight line HLa.

An inner periphery 148c of the peripheral wall portion 148 has an arc shape along the outer periphery of the plate member 8 (base portion 80) when viewed from the rotation axis X direction. An inner diameter of the inner periphery 148c of the peripheral wall portion 148 is slightly larger than the outer diameter of the plate member 8. Here, the rotation axis X is used as a reference for the inner diameter of the inner periphery 148c and the outer diameter of the plate member 8.

Inside the peripheral wall portion 148, the stepped portion 148d recessed toward the back side of paper surface is provided.

When the plate member 8 is mounted to the fourth box 14, the outer peripheral edge of the plate member 8 (base portion 80) is in contact with the stepped portion 148d from the rotation axis X direction.

Boss portions 18 each including a bolt hole 18a are formed integrally with the peripheral wall portion 148 on the outside of the peripheral wall portion 148. The boss portions 18 are provided near the upper end portion 148a and the lower end portion 148b of the peripheral wall portion 148, respectively. The boss portions 18 and 18 protrude further to the front side of paper surface than the peripheral wall portion 148.

The peripheral wall portion 149 is positioned below the breather chamber 16. The peripheral wall portion 149 is positioned on a further back side of paper surface than a wall portion 160 that partitions the breather chamber 16.

An upper end portion 149a of the peripheral wall portion 149 is connected to the boss portion 18 on the vertical line VL as viewed from the rotation axis X direction. A side wall portion 159 extending toward the oil catch portion 15 is further connected to the boss portion 18. A lower end portion 149b of the peripheral wall portion 149 is connected to the peripheral wall portion 141 of the fourth box 14 on the lower side of the breather chamber 16.

An inner periphery 149c of the peripheral wall portion 149 has an arc shape along the outer periphery of the plate member 8 (base portion 80) when viewed from the rotation axis X direction. An inner diameter of the inner periphery 149c of the peripheral wall portion 149 is slightly larger than the outer diameter of the plate member 8. Here, the rotation axis X is used as a reference for the inner diameter of the inner periphery 149c and the outer diameter of the plate member 8.

Inside the peripheral wall portion 149, the stepped portion 149d recessed toward the back side of paper surface is provided. When the plate member 8 is mounted to the fourth box 14, the outer peripheral edge of the plate member 8 (base portion 80) is in contact with the stepped portion 149d from the rotation axis X direction.

The boss portions 18 and 18 each including the bolt hole 18a are formed integrally with the peripheral wall portion 149 on the outside of the peripheral wall portion 149.

The boss portions 18 and 18 are provided at an interval in the circumferential direction around the rotation axis X. The boss portions 18 are provided on the outer periphery of the upper end portion 148a of the peripheral wall portion 149 and on an outer periphery of a region positioned on the lower side of the breather chamber 16.

The boss portions 18 and 18 protrude further to the front side of paper surface than the peripheral wall portion 149.

In the fourth box 14, the arcuate wall portion 17 is provided in a region below the breather chamber 16 and below the horizontal line HL. The arcuate wall portion 17 is provided at a position that is shifted by approximately 180° in phase with respect to the peripheral wall portion 148 in the circumferential direction around the rotation axis X.

An inner periphery 17c of the arcuate wall portion 17 has an arc shape along the outer periphery of the plate member 8 (base portion 80) when viewed from the rotation axis X direction. An inner diameter of the inner periphery 17c of the arcuate wall portion 17 is slightly larger than the outer diameter of the plate member 8. Here, the rotation axis X is used as a reference for the inner diameter of the inner periphery 17c and the outer diameter of the plate member 8.

The boss portion 18 including the bolt hole 18a is formed in the arcuate wall portion 17 at a position that intersects with the straight line HLa. The boss portion 18 protrudes toward the further front side of paper surface than the arcuate wall portion 17.

The stepped portion 17d is provided on the inner periphery of the boss portion 18 protruding towards the rotation axis X direction.

When the plate member 8 is mounted to the fourth box 14, the outer peripheral edge of the plate member 8 (base portion 80) is in contact with the stepped portion 17d from the rotation axis X direction.

Here, in order to mount the plate member 8 to the fourth box 14, first, the outer peripheral edge of the plate member 8 (base portion 80) is brought into contact with the stepped portions 148d and 149d of the peripheral wall portions 148 and 149 and the step portion 17d of the arcuate wall portion 17 from the rotation axis X direction. Subsequently, the plate member 8 is fixed to the fourth box 14 by screwing bolts B passing through the bolt holes 81a to 85a of the connecting pieces 81 to 85 into the corresponding bolt holes 18a of the boss portions 18 (see FIG. 16).

Figures 16, 17:
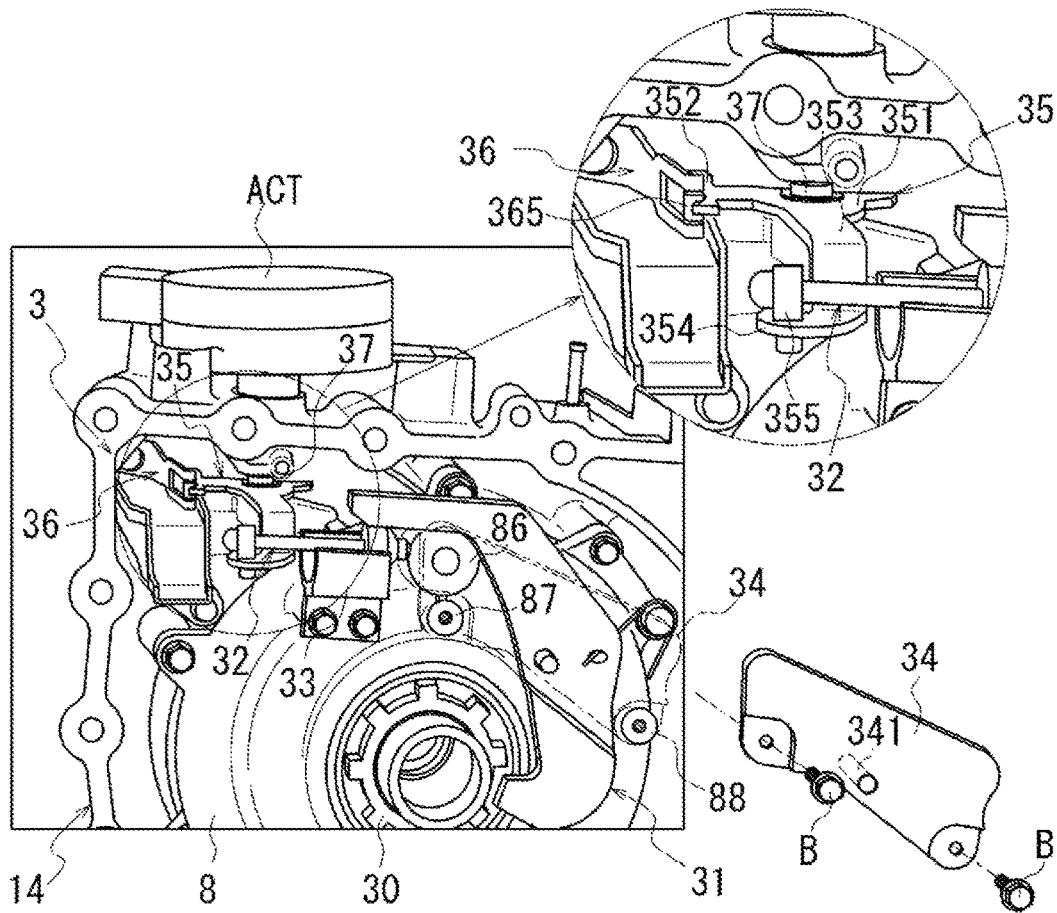
FIG. 16 is a diagram illustrating a park lock mechanism.
FIG. 17 is a diagram illustrating the park lock mechanism.
Figure 18:
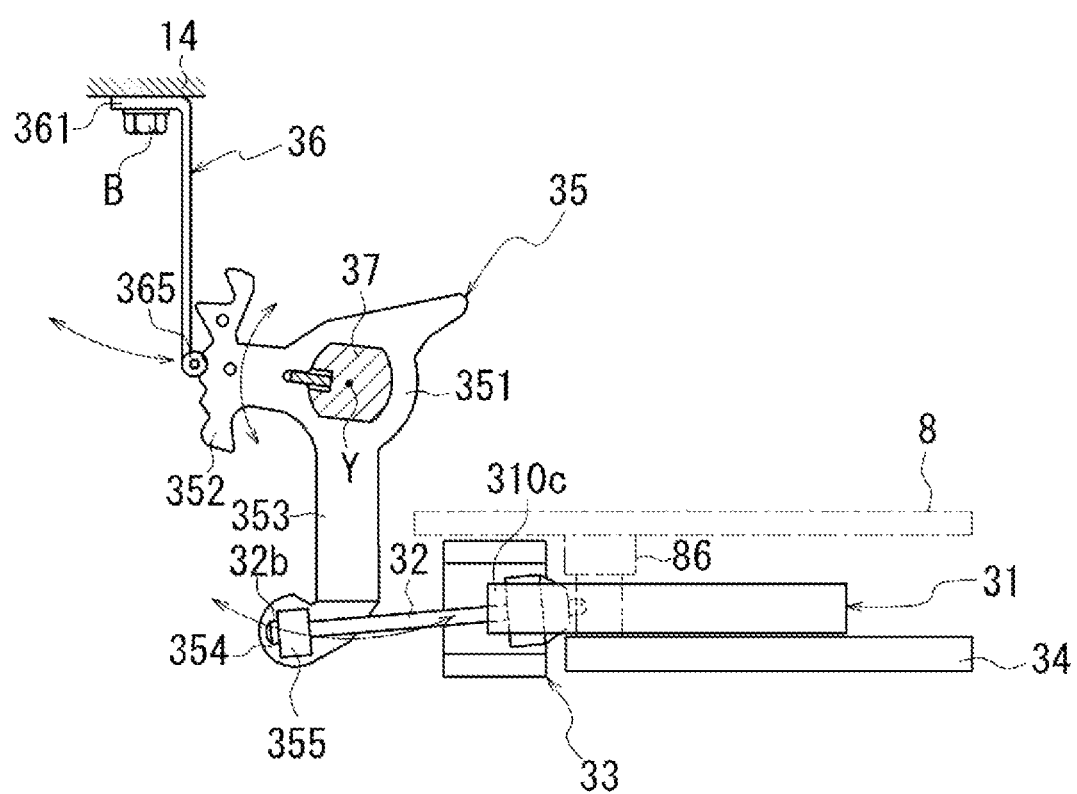
FIG. 18 is a diagram illustrating the park lock mechanism.

FIGS. 16, 17, and 18 are diagrams illustrating the park lock mechanism 3. FIG. 16 is a perspective view of the fourth box 14 provided with the park lock mechanism 3 as viewed from diagonally above. FIG. 17 is a plan view of the fourth box 14 provided with the park lock mechanism 3 as viewed from the motor 2 side. FIG. 18 is a top view of the park lock mechanism 3.

As shown in FIG. 16, the park lock mechanism 3 includes a park gear 30, a park pole 31, a park rod 32, the support 33, a holder 34, a manual plate 35, a detent spring 36, a manual shaft 37.

The park lock mechanism 3 is a park-by-wire type park lock mechanism. The park lock mechanism 3 rotates the manual shaft 37 around the rotation axis Y (see FIG. 18) by an actuator ACT when a sensor detects that the vehicle equipped with the power transmission device 1 is switched between a driving mode and a parking mode.

In the present embodiment, the park gear 30, the park pole 31, the park rod 32, the support 33, and the holder 34 are positioned on the motor 2 side of the plate member 8 (the lower side in FIG. 18). The manual plate 35, the detent spring 36, and the manual shaft 37 are positioned on the opposite side.

The holder 34 is a plate-like member. The holder 34 includes a protruding portion 341 for supporting the park pole 31. As shown in FIGS. 16 and 17, the park pole 31 is supported by the plate member 8 via the holder 34.

The park pole 31 is an integral part that includes a first plate-like portion 310 including an insertion hole 310d and a second plate-like portion 311 including a claw portion 311c.

The protruding portion 341 on the holder 34 side is inserted into the insertion hole 310d of the park pole 31. The park pole 31 is rotatably supported by the protruding portion 341. In the rotation 310, the park pole 31 extends along the straight line Lx2 in a region beyond the bent portion 310e. A tip side of this region serves as an operated portion 310c that is operated by a cam 320 of the park rod 32.

The operated portion 310c is mounted on the cam 320 supported by the support 33.

The claw portion 311c is provided below the second plate-like portion 311 when viewed from the rotation axis X direction. The claw portion 311c is an engaging portion with the park gear 30. The claw portion 311c is formed protruding from a lower portion of the second plate-like portion 311 toward the rotation axis X side.

In the first plate-like portion 310 of the park pole 31, a locking hole 310f is provided on a side of the insertion hole 310d. One end of a spring Sp externally inserted into the support pin 85b of the plate member 8 is engaged with the locking hole 310f. The park pole 31 is constantly urged in a direction (counterclockwise direction in FIG. 17: see the arrow) to separate the claw portion 311c from the park gear 30 by a biasing force from the spring Sp.

As shown in FIG. 3, the first plate-like portion 310 of the park pole 31 is disposed between the holder 34 and the plate member 8 in the rotation axis X direction. The second plate-like portion 311 is positioned closer to the motor 2 side (right side in the drawing) than the first plate-like portion 310. The second plate-like portion 311 extends downward on an inner diameter side of the holder 34.

As shown in FIG. 17, the park rod 32 is provided along a straight line Lx3 orthogonal to the rotation axis X and passing above the horizontal line HL when viewed from the rotation axis X direction.

The park rod 32 is provided such that a tip side where the cam 320 is externally inserted faces the park pole 31 side (breather chamber 16 side). The cam 320 is inserted between the support 33 and the operated portion 310c of the park pole 31.

When the park rod 32 is displaced in a direction (to the right side in FIG. 18) in which the cam 320 is pushed into between the support 33 and the operated portion 310c of the park pole 31, the cam 320 pushes up the operated portion 310c.

As a result, the park pole 31 is rotated clockwise in FIG. 17 and disposed at an engagement position. The engaging position is a position where the claw portion 311c is engaged with an outer periphery of the park gear 30.

When the park rod 32 is displaced in a direction (to the left side in FIG. 18) in which the cam 320 is pulled out from between the support 33 and the operated portion 310c of the park pole 31, the park pole 31 is rotated counterclockwise in FIG. 17 due to a biasing force of the spring Sp. The park pole 31 rotated in the counterclockwise direction is disposed at a detachment position. The detachment position is a position where the claw portion 311c is detached from the outer periphery of the park gear 30.

As shown in FIG. 18, the other end 32b of the park rod 32 is supported by a connecting portion 355 of the manual plate 35. In this state, the park rod 32 is provided so as to be displaceable in the axial direction while being prevented from coming off from the connecting portion 355.

The manual plate 35 includes a base portion 351, an arm portion 353, and an engaging portion 352. The base portion 351 is externally inserted into the manual shaft 37. The arm portion 353 and the engaging portion 352 extend in a radial direction of a rotation axis Y of the manual shaft 37 from an outer periphery of the base portion 351.

The base portion 351 is fixed to the manual shaft 37 in a state where rotation thereof with respect to the manual shaft 37 is restricted.

The arm portion 353 extends from the outer periphery of the base portion 351 toward the motor 2. When viewed from the radial direction of the rotation axis X, the arm portion 353 crosses an outer diameter side of the plate member 8 on the motor 2 side.

As shown in FIG. 16, a tip side of the arm portion 353 is bent downward (to the rotation axis side), and then connected to the support portion 354 including an upper surface to which the connecting portion 355 is fixed.

As shown in FIG. 18, a base end portion 361 in the longitudinal direction of the detent spring 36 is fixed to the fourth box 14 with the bolt B. A tip side of the detent spring 36 where a roller 365 is provided can be elastically displaced in the radial direction of the base portion 351 of the manual plate 35. The tip side of the detent spring 36 is in pressure contact with the outer periphery (concave portion) of the base portion 351 of the manual plate 35.

In the embodiment, the manual shaft 37 rotates around the rotation axis Y in conjunction with switching between the driving mode and the parking mode of the vehicle equipped with the power transmission device 1.

When the manual shaft 37 rotates, the manual plate 35 fixed to the manual shaft 37 also rotates around the rotation axis Y. Then, the arm portion 353 extending from the base portion 351 of the manual plate 35 and the connecting portion 355 fixed to the support portion 354 at the tip of the arm portion 353 are displaced in the circumferential direction around the rotation axis Y. The park rod 32 connected to the connecting portion 355 is also displaced in the longitudinal direction of the park rod 32.

As shown in FIG. 2, below the gear chamber Sb of the fourth box 14, a strainer chamber SR (second chamber) is provided adjacent to the gear chamber Sb. A strainer 90 is disposed inside the strainer chamber SR. Although omitted in FIG. 2 because of schematic illustration, the strainer 90 is fixed inside the strainer chamber SR by a fixture (not shown).

Figure 19:
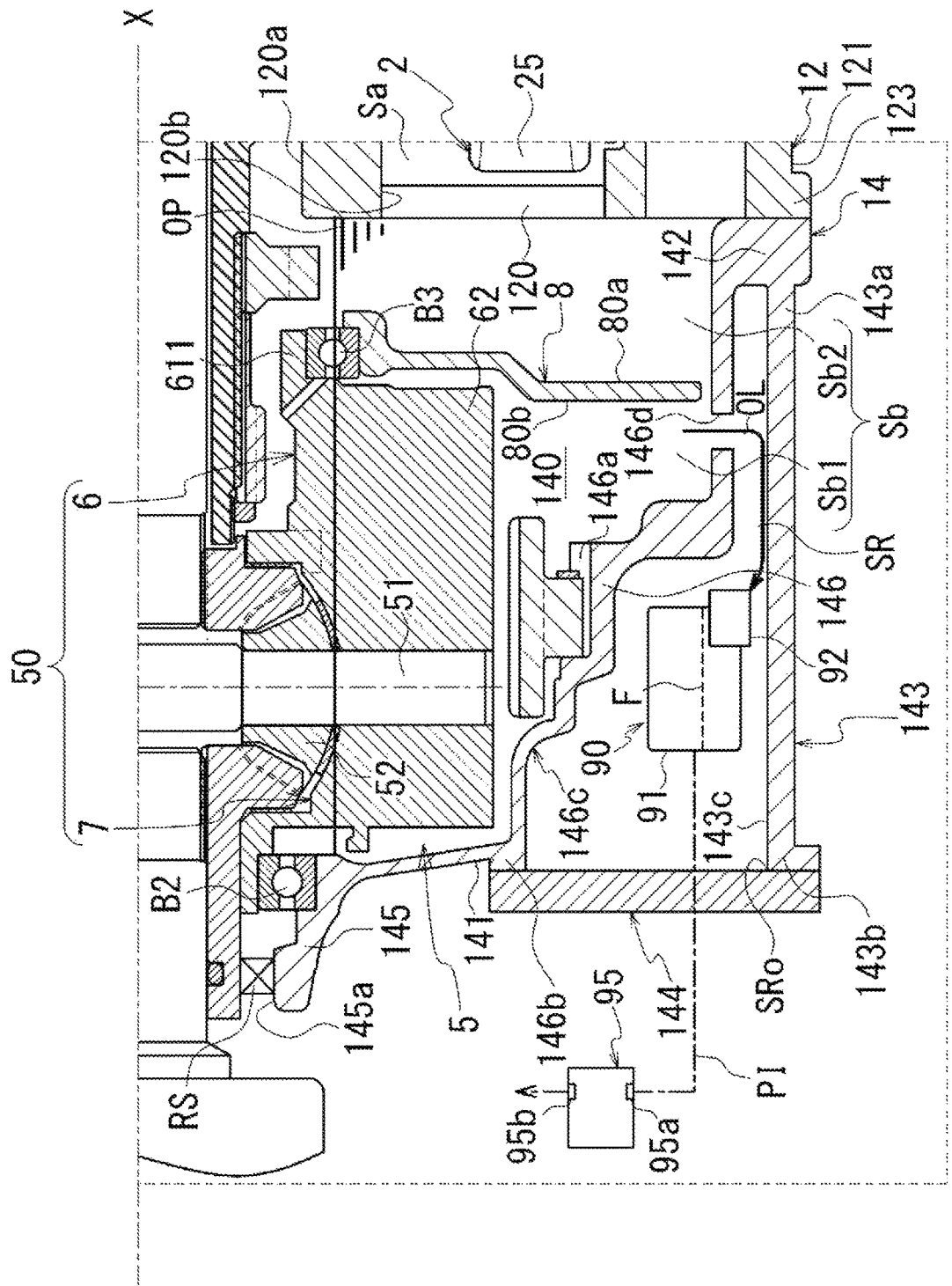
FIG. 19 is an enlarged view around a strainer chamber.

FIG. 19 is an enlarged view around the strainer chamber SR.

As shown in FIG. 19, the strainer chamber SR is a space surrounded by the support wall portion 146, the jacket portion 143, and the lid portion 144, and is provided separated from the gear chamber Sb. In other words, the strainer chamber SR is separated from the gear chamber Sb by the support wall portion 146 which is an inner wall of the fourth box 14.

A stepped portion 146c formed from a plurality of steps is provided at a lower portion of the support wall portion 146. The stepped portion 146c gradually increases in diameter from the joint portion 146b with the lid portion 144 toward the joint portion 142 with the second box 12.

The jacket portion 143 is a wall portion that covers the outer periphery (outer side in the radial direction) of the stepped portion 146c. The jacket portion 143 extends along the rotation axis X direction. A base end portion 143a provided on one end side of the stepped portion 146c in the rotation axis X direction is connected to the joint portion 142 in the lower portion of the fourth box 14. The lid portion 144 is joined to the joint portion 143b provided on the other end side of the stepped portion 146c in the rotation axis X direction.

An inner wall surface 143c of the jacket portion 143 faces the stepped portion 146c with a gap therebetween that gradually narrows from the joint portion 143b toward the base end portion 143a. The joint portion 143b of the jacket portion 143 and the joint portion 146b of the support wall portion 146 form an opening portion SRo of the strainer chamber SR. The lid portion 144 closes the opening portion SRo of the strainer chamber SR.

In this way, the strainer chamber SR provided using the stepped portion 146c of the support wall portion 146 overlaps the gear chamber Sb in the rotation axis X direction and the radial direction of the rotation axis X. In the fourth box 14, an outer diameter of the stepped portion 146c of the support wall portion 146 decreases as the distance from the second box 12 increases. Therefore, there is a spatial margin on the outer diameter side of the stepped portion 146c. This space increases in radial size toward the left side in FIG. 19. In the present embodiment, this space is used to provide the strainer chamber SR. The stepped portion 146c has a smaller diameter than the peripheral wall portion 121 of the second box 12. As shown in FIG. 2, a part of the jacket portion 143 of the strainer chamber SR overlaps the peripheral wall portion 121 of the second box 12 forming the motor chamber Sa in the rotation axis X direction.

The stepped portion 146c is formed with an opening portion 146d that allows the gear chamber Sb and the strainer chamber SR to communicate with each other. The opening portion 146d is positioned on the surface 80b side of the plate member 8 in the rotation axis X direction. The opening portion 146d penetrates the support wall portion 146 in the radial direction of the rotation axis X and opens upward in the vertical direction. A part of the oil OL in the oil storage portion OP of the gear chamber Sb also flows into the strainer chamber SR through the opening portion 146d, forming an oil reservoir inside the strainer chamber SR.

The strainer 90 disposed inside the strainer chamber SR includes a main body portion 91 and a suction port 92 (pump inlet). The main body portion 91 is, for example, a hollow container. A filter F for filtering the oil OL is disposed inside the main body portion 91. The suction port 92 can be, for example, a tubular member protruding downward from a lower surface of the main body portion 91. At least the suction port 92 of the strainer 90 is immersed in the oil reservoir in the strainer chamber SR, that is, is immersed in oil. The oil OL is introduced into the main body portion 91 through the suction port 92.

The strainer 90 is connected via a pipe PI to a suction port 95a of an oil pump 95 (pump) provided outside the strainer chamber SR. For example, an electric oil pump driven by a motor (not shown) can be used as the oil pump 95. Driving of the oil pump 95 is controlled by a control device (not shown).

A discharge port 95b of the oil pump 95 is connected to oil holes Ha, Hb, and Hc (see FIG. 2) formed in the upper portion of the main body box 10 via a pipe (not shown) disposed inside the vehicle. The oil hole Ha is formed on an upper portion of the fourth box 14 and on the outer diameter side of the differential case 50. The oil hole Hb is formed on an upper portion of the second box 12 and on the outer diameter side of the coil end 251b of the motor 2. The oil hole Hc is formed on an upper portion of the third box 13 and near the coil end 253a of the motor 2.

Functions of the power transmission device 1 having such a configuration will be described.

As shown in FIG. 1, in the power transmission device 1, the planetary reduction gear 4, the differential mechanism 5 and the drive shafts DA and DB are arranged along the transmission path of the output rotation of the motor 2.

When the motor 2 is driven and the rotor core 21 rotates around the rotation axis X, the rotation is input to the sun gear 41 of the planetary reduction gear 4 via the motor shaft 20 that rotates together with the rotor core 21.

As shown in FIG. 3, in the planetary reduction gear 4, the sun gear 41 serves as an input unit for the output rotation of the motor 2. The differential case 50 that supports the stepped pinion gear 43 serves as an output unit for the input rotation.

When the sun gear 41 rotates around the rotation axis X due to the input rotation, the stepped pinion gear 43 (the large-diameter gear portion 431 and the small-diameter gear portion 432) rotates around the axis line X1 due to the rotation input from the sun gear 41 side.

Here, the small-diameter gear portion 432 of the stepped pinion gear 43 meshes with the ring gear 42 fixed to the inner periphery of the fourth box 14. Therefore, the stepped pinion gear 43 revolves around the rotation axis X while rotating around the axis line X1.

Here, in the stepped pinion gear 43, the outer diameter R2 of the small-diameter gear portion 432 is smaller than the outer diameter R1 of the large-diameter gear portion 431 (see FIG. 3).

As a result, the differential case 50 (the first case portion 6 and the second case portion 7) that supports the stepped pinion gear 43 rotates around the rotation axis X at a rotation speed lower than that of the rotation input from the motor 2 side.

Therefore, the speed of the rotation input to the sun gear 41 of the planetary reduction gear 4 is greatly reduced by the stepped pinion gear 43. The speed-reduced rotation is output to the differential case 50 (differential mechanism 5).

Then, when the differential case 50 rotates around the rotation axis X due to the input rotation, the drive shafts DA and DB meshing with the pinion mate gear 52 rotate around the rotation axis X within the differential case 50. As a result, the left and right driving wheels (not shown) of the vehicle equipped with the power transmission device 1 are rotated by the transmitted rotational driving force.

As shown in FIG. 2, inside the motor chamber Sa and the gear chamber Sb, there is formed the oil storage portion OP in which the oil OL for lubricating is stored. The oil OL stored in the oil storage portion OP is scraped up by the rotation of the motor 2 and cools the motor 2. A part of the oil OL that is scraped up also flows into the internal space Sc through the opening 136a of the connection wall 136 to lubricate the bearings B1 and B4.

In the gear chamber Sb, the oil OL stored in the oil storage portion OP is scraped up by the differential case 50 rotating around the rotation axis X when the output rotation of the motor 2 is transmitted.

The scraped up oil OL lubricates a meshing portion between the sun gear 41 and the large-diameter gear portion 431, a meshing portion between the small-diameter gear portion 432 and the ring gear 42, and a meshing portion between the pinion mate gear 52 and the side gears 54A and 54B.

As shown in FIG. 8, the differential case 50 rotates around the rotation axis X in the counterclockwise direction CCW when viewed from the third box 13 side.

The oil catch portion 15 is provided on the upper portion of the fourth box 14. The oil catch portion 15 is positioned downstream of the rotational direction of the differential case 50. Most of the oil OL scraped up by the differential case 50 flows into the oil catch portion 15 and is supplied to the oil guide 152 placed on the support base portion 151 inside the oil catch portion 15. As shown in FIG. 10, a part of the oil OL supplied to the oil guide 152 drops from the tip 154b and lubricates the park gear 30 and the like (see FIG. 3) of the park lock mechanism 3 positioned below.

In this way, most of the oil OL scraped up by the differential case 50 flows into the oil catch portion 15, but the oil OL that falls due to gravity returns to the oil storage portion OP and is stored therein. A part of the oil OL stored in the oil storage portion OP flows into the oil reservoir portion 128 according to gravity. Although the temperature of the oil OL rises due to the motor 2 and the scraping up of the differential case 50, the oil OL flows into the oil reservoir portion 128 and is cooled by the coolant CL flowing through the cooling path CP.

As shown in FIG. 19, a part of the oil OL stored in the oil storage portion OP flows into the strainer chamber SR through the opening portion 146d due to gravity and centrifugal force generated by scraping up of the differential case 50. A part of the oil OL also flows into the strainer chamber SR due to a negative pressure generated by suction of the oil pump 95.

When the oil pump 95 is driven, the oil OL in the strainer chamber SR is sucked through the suction port 92 of the strainer 90. The oil OL introduced into the main body portion 91 of the strainer 90 passes through the filter F to filter out impurities. The filtered oil OL is sucked into the suction port 95a of the oil pump 95 via the pipe PI.

The oil OL sucked by the oil pump 95 is discharged from the discharge port 95b. The oil OL discharged from the discharge port 95b is supplied to the oil holes Ha, Hb, and Hc (see FIG. 2) inside the main body box 10. The oil OL supplied to the oil hole Ha is supplied to the planetary reduction gear 4 in the fourth box 14, the differential case 50, and the like. The oil OL supplied to the oil hole Hb is supplied to the coil end 253b side of the motor 2 and the park lock mechanism 3. The oil OL supplied to the oil hole Hc is supplied to the coil end 253a side of the motor 2. Thus, the power transmission device 1 has a mechanism for filtering and circulating the oil OL used for lubricating and cooling each component.

In the embodiment, the strainer 90 is disposed in the strainer chamber SR. The strainer chamber SR is spaced apart from the gear chamber Sb accommodating the planetary reduction gear 4 and the differential case 50, which constitute the gear mechanism. Specifically, the strainer chamber SR is separated from the gear chamber Sb by the support wall portion 146. Here, it is conceivable to dispose the strainer 90 so as to be immersed in the oil storage portion OP of the gear chamber Sb. In this case, the amount of the oil OL near the suction port 92 of the strainer 90 may decrease due to the differential case 50 scraping up the oil OL in the oil storage portion OP. When the oil pump 95 operates in this state, the oil pump 95 may suck air, which may affect the suction performance of the oil pump 95.

On the other hand, in the embodiment, the strainer 90 is disposed in the strainer chamber SR separated from the gear chamber Sb. In this way, decrease in the amount of the oil OL near the suction port 92 of the strainer 90 that is caused by the oil OL being scraped up by the differential case 50 is reduced. Therefore, air suction of the oil pump 95 is reduced.

When the main body portion 91 of the strainer 90 is disposed inside the gear chamber Sb, a space is required for the strainer 90, so that the layout of other parts is likely to be restricted. By disposing the strainer 90 in the strainer chamber SR, it is possible to improve the degree of freedom in the layout of the parts inside the gear chamber Sb while ensuring the volume of the main body portion 91.

In the embodiment, the stepped portion 146c of the support wall portion 146 of the fourth box 14 is used to provide the strainer chamber SR. The strainer chamber SR overlaps the gear chamber Sb in the rotation axis X direction and the radial direction of the rotation axis X. As a result, the strainer chamber SR can be prevented from protruding from the gear chamber Sb in the rotation axis X direction and the radial direction, and the layout of the power transmission device 1 can be improved. Since the strainer chamber SR is positioned below the gear chamber Sb, the oil OL tends to flow from the oil storage portion OP into the strainer chamber SR due to gravity. A part of the jacket portion 143 of the strainer chamber SR overlaps the peripheral wall portion 121 of the second box 12 forming the motor chamber Sa in the rotation axis X direction. As a result, protrusion of the strainer chamber SR from the motor chamber Sa in the radial direction of the rotation axis X is reduced.

As described above, the power transmission device 1 according to the embodiment has the following configuration.

(1) The power transmission device 1 includes:
the motor 2;
the planetary reduction gear 4 and the differential mechanism 5 (gear mechanism) connected downstream of the motor 2;
the oil pump 95 (pump) that sucks the oil OL through the suction portion 92 (pump inlet) of the strainer 90; and
the main body box 10 (box) that includes the gear chamber Sb (first chamber) accommodating the planetary reduction gear 4 and the differential mechanism 5 (gear mechanism) and the strainer chamber SR (second chamber) in which the suction port 92 (pump inlet) of the strainer 90 is disposed.

When the suction port 92 (pump inlet) of the strainer 90 is disposed in the gear chamber Sb, the oil OL on the outer peripheral side of the differential case 50 is scraped up as the differential case 50 constituting the differential mechanism 5 (differential gear) rotates. Due to this scraping up, the amount of oil near the suction port 92 of the strainer 90 decreases, and the oil pump 95 may suck air.

The strainer chamber SR (second chamber), which is separated from (isolated from) the gear chamber Sb (first chamber), is less likely to be affected by the decrease in the amount of oil caused by the rotation of the differential case 50. Therefore, air suction of the oil pump 95 can be reduced by disposing the suction port 92 of the strainer 90, which is the pump inlet, in the strainer chamber SR.

Note that the first chamber is "a space surrounded by a first wall", and the second chamber is "a space surrounded by a second wall". However, the first wall and the second wall may share a part thereof with each other. In the embodiment, the gear chamber Sb (first chamber) is a space surrounded by the support wall portion 146 of the fourth box 14, and the strainer chamber SR (second chamber) is a space surrounded by the support wall portion 146 and the jacket portion 143. The gear chamber Sb and the strainer chamber SR share the support wall portion 146.

Note that in other words, such a configuration can be said as a configuration in which a partition wall portion is provided between the suction port 92 (pump inlet) of the strainer 90 and the planetary reduction gear 4 and the differential mechanism 5 (gear mechanism).

The "pump inlet" is in contact with the reserved oil, that is, is immersed in the reserved oil and is connected to the suction port 95a of the oil pump 95. As in the embodiment, when the strainer 90 is connected to the suction port 95a of the oil pump 95, the suction portion 92 of the strainer 90 corresponds to the "pump inlet". For example, when the suction port 95a of the oil pump 95 is in direct contact with (immersed in) the reserved oil, the suction port 95a of the oil pump 95 corresponds to the "pump inlet". This case will be explained in Modification 1 below.

The "gear mechanism" is the entire mechanism including gears. For example, in the case of the embodiment, the gear mechanism includes the planetary reduction gear 4 and the differential mechanism 5 (differential gear).

"Connected downstream" means a connection relation in which power is transmitted from a component disposed upstream to a component positioned downstream. For example, the "planetary reduction gear 4 connected downstream of the motor 2" means that power is transmitted from the motor 2 to the planetary reduction gear 4.

Note that, for example, the gear mechanism may be connected downstream of the motor 2 via a transmission mechanism, a clutch, or the like. In this case, the connection relation is such that the power of the motor 2 is transmitted to the gear mechanism via the transmission mechanism, the clutch, or the like. The transmission mechanism is a mechanism having a transmission function, and includes, for example, a stepped transmission mechanism and a continuously variable transmission mechanism.

The "power transmission device" is a power train device (transmission, speed reducer, or the like) equipped with a rotating electric machine.

(2) The power transmission device 1 includes the drive shaft DA (drive shaft) connected downstream of the planetary reduction gear 4 and the differential mechanism 5 (gear mechanism) and disposed passing through the inner periphery of the motor 2.

In the power transmission device 1 having such a configuration, by disposing the suction port 92 (pump inlet) of the strainer 90 in the strainer chamber SR (second chamber), there is no need to consider the layout for disposing the suction port 92 in the gear chamber Sb (first chamber) in which the planetary reduction gear 4 and the differential mechanism 5 (gear mechanism) are accommodated, and the degree of freedom in designing the layout of the gear chamber Sb can be improved.

(3) The main body box 10 (box) includes the opening portion 146d that allows the gear chamber Sb (first chamber) and the strainer chamber SR (second chamber) to communicate with each other.

By providing the opening portion 146d, it is possible to introduce the oil OL from the gear chamber Sb into the strainer chamber SR using gravity or centrifugal force due to scraping up of the differential case 50. As a result, an increase in the amount of oil in the strainer chamber SR can be promoted, and the air suction by the oil pump 95 can be further reduced.

(4) The pump inlet is configured as the suction port 92 of the strainer 90. At least a part of the main body portion 91 of the strainer 90 is disposed in the strainer chamber SR (second chamber).

The main body portion 91 of the strainer 90 requires a space for disposition thereof. By disposing the main body portion 91 in the strainer chamber SR that is isolated from the gear chamber Sb, the degree of freedom in layout of the gear chamber Sb can be improved. Note that in the embodiment, although the entire main body portion 91 is disposed in the strainer chamber SR, a part of the main body portion 91 may be disposed in the strainer chamber SR and the rest may be disposed outside the strainer chamber SR. Therefore, the volume of the main body portion 91 can be increased. In this case, the main body portion 91 disposed inside and outside the strainer chamber SR may be connected to each other by a pipe or the like.

(5) The strainer chamber SR (second chamber) overlaps the gear chamber Sb (first chamber) in the rotation axis X direction (axial direction).

In the embodiment, the strainer chamber SR is provided using the stepped portion 146c of the fourth box 14, and overlaps the gear chamber Sb in the rotation axis X direction. As a result, the strainer chamber SR is prevented from protruding radially outward from the gear chamber Sb, and the layout of the power transmission device 1 can be improved.

(6) The strainer chamber SR (second chamber) overlaps the gear chamber Sb (first chamber) in the radial direction of the rotation axis X (radial direction).

As a result, it is possible to reduce the protrusion of the strainer chamber SR in the rotation axis X direction from the gear chamber Sb, thereby improving the layout.

In the embodiment, the strainer chamber SR overlaps the gear chamber Sb both in the rotation axis X direction and in the radial direction of the rotation axis X. In this case, the protrusion of the strainer chamber SR in both the radial direction of the rotation axis X and the rotation axis X direction can be reduced, and a well-balanced layout can be realized.

(7) The strainer chamber SR (second chamber) is positioned below the gear chamber Sb (first chamber).

By disposing the gear chamber Sb at a position where the oil OL tends to accumulate due to gravity, it is possible to promote an increase in the amount of oil in the strainer chamber SR. Note that "below the gear chamber Sb" means a lower side in the vertical direction when the power transmission device 1 is mounted on the vehicle.

(8) The gear mechanism includes the planetary reduction gear 4.

As described above, the gear mechanism means the entire mechanism including gears, and in the embodiment, the planetary reduction gear 4 is included as the gear mechanism.

Modification 1

Figure 20:
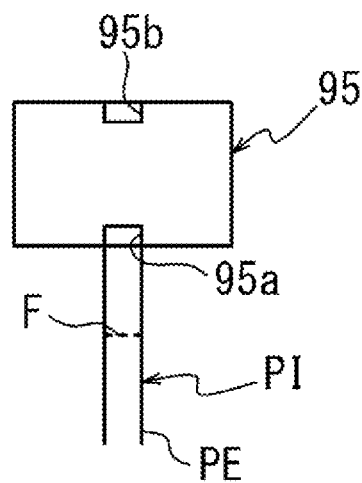
FIG. 20 is a diagram showing a configuration example of an oil pump according to Modification 1.
Figure 21:
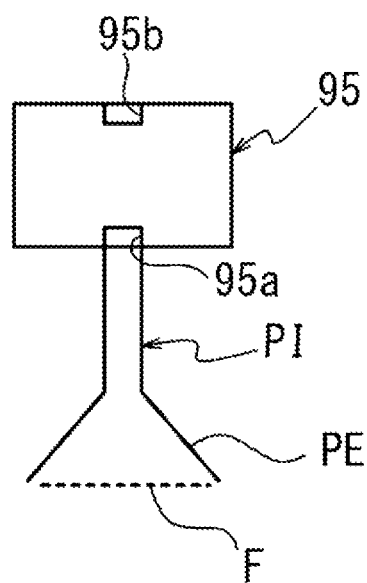
FIG. 21 is a diagram showing a configuration example of the oil pump according to Modification 1.
Figure 22:
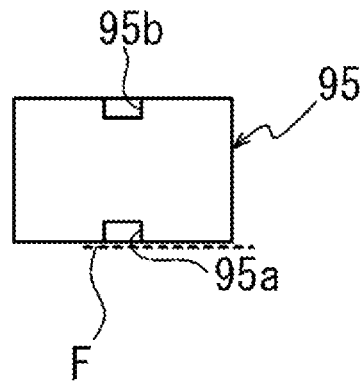
FIG. 22 is a diagram showing a configuration example of the oil pump according to Modification 1.

FIGS. 20 to 22 are diagrams showing a configuration example of the oil pump 95 according to Modification 1.

In the embodiment, in the power transmission device 1, an example in which the mechanism for filtering and circulating the oil OL is constituted by the oil pump 95 and the strainer 90, is described (see FIG. 2). However, the circulation mechanism for the oil OL is not limited to the example in the embodiment, and may be configured without the strainer 90, for example.

As shown in FIG. 20, when the strainer is omitted, the filter F for filtering impurities may be disposed inside the pipe PI connected to the suction port 95a of the oil pump 95.

In the case of FIG. 20, when the oil pump 95 is driven, the oil OL is sucked from the end portion PE of the pipe PI, passes through the filter F, and is sucked into the suction port 95a of the oil pump 95. That is, the end portion PE of the pipe PI corresponds to the "pump inlet".

FIG. 21 also shows an example in which the end portion PE of the pipe PI corresponds to the "pump inlet" as in FIG. 20, but in FIG. 21, the end portion PE of the pipe PI is expanded in diameter, and the filter F is disposed at the end portion PE. By configuring as shown in FIG. 21, the size of the filter F can be increased.

With the configuration in FIGS. 20 and 21, both the oil pump 95 and the pipe PI may be disposed in the strainer chamber SR (see FIG. 2). Alternatively, the oil pump 95 may be disposed outside the strainer chamber SR, and a part of the pipe PI may be disposed in the strainer chamber SR. In this case, at least the end portion PE of the pipe PI may be disposed in the strainer chamber SR so as to be immersed in the oil OL.

FIG. 22 shows an example in which the pipe is also omitted, and the filter F is disposed directly at the suction port 95a of the oil pump 95. In this case, the suction port 95a corresponds to the "pump inlet". In the case of the configuration in FIG. 22, the oil pump 95 may be disposed in the strainer chamber SR and the suction port 95a may be disposed so as to be immersed in the oil OL stored in the strainer chamber SR.

Modification 2

Figure 23:
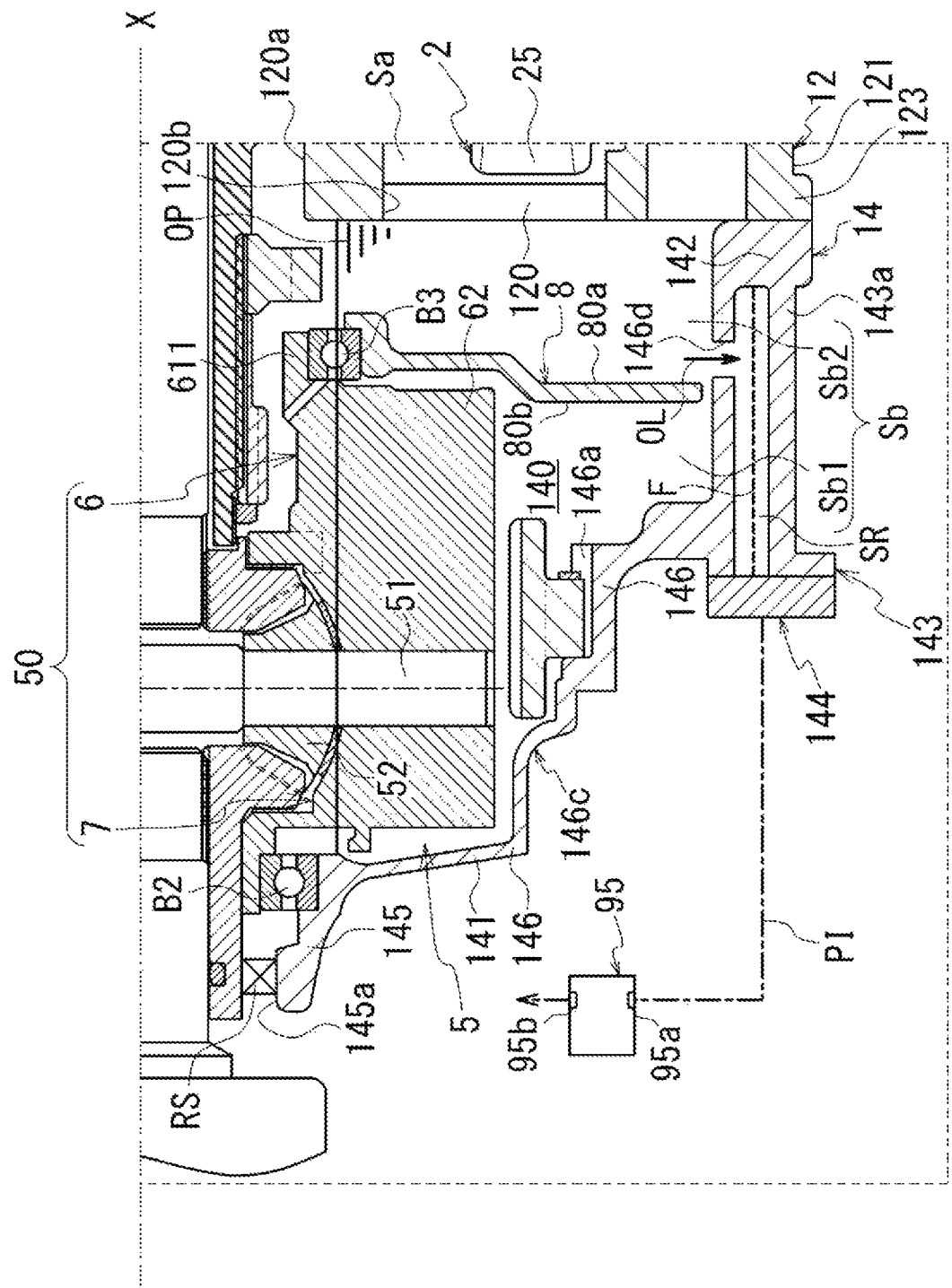
FIG. 23 is a diagram showing a configuration of a strainer chamber according to Modification 2.

FIG. 23 is a diagram showing a configuration of the strainer chamber SR according to Modification 2.

In Modification 2, an example in which the strainer 90 is omitted and the strainer chamber SR itself is configured as a strainer is described.

As shown in FIG. 23, in Modification 2, the stepped portion 146c of the fourth box 14 is also used to provide the strainer chamber SR, but the lid portion 144 is attached closer to the joint portion 142 than in the embodiment. As a result, the strainer chamber SR is made smaller than in the embodiment. In the embodiment, the opening portion 146d that allows the gear chamber Sb and the strainer chamber SR to communicate with each other is provided on the surface 80b side of the plate member 8 (see FIG. 19), but in Modification 2, the opening portion 146d is provided on the surface 80a side of the plate member 8.

A filter F for filtering the oil OL is disposed inside the strainer chamber SR. The strainer chamber SR and the suction port 95a of the oil pump 95 are connected via the pipe PI.

In Modification 2, the opening portion 146d provided on the support wall portion 146 is a suction port of the strainer and functions as the "pump inlet". The inside of the strainer chamber SR in which the filter F is disposed functions as a main body portion of the strainer that filters the oil OL.

As in the embodiment, gravity and the centrifugal force due to scraping up of the differential case 50 cause the oil OL to flow from the oil storage portion OP of the gear chamber Sb into the strainer chamber SR through the opening portion 146d.

Furthermore, when the oil pump 95 is driven, the oil OL in the gear chamber Sb is sucked into the strainer chamber SR through the opening portion 146d, which is a suction port. The oil OL is filtered by passing through the filter F disposed inside the strainer chamber SR. The filtered oil OL is sucked into the oil pump 95 through the pipe PI.

In Modification 2, the opening portion 146d corresponding to the "pump inlet" opens upward in the vertical direction, so that the oil OL is easily sucked in by gravity. The opening portion 146d is moved from the surface side of the plate member 8 facing the gear mechanism (the planetary reduction gear 4 and the differential case 50) to the surface 80a side facing the motor 2.

As described above, the amount of oil near the differential case 50 may decrease due to the oil OL being scraped up by the differential case 50. In Modification 2, by disposing the opening portion 146d corresponding to the "pump inlet" at a position away from the differential case 50, air suction of the oil pump 95 can be reduced.

The second gear chamber Sb2 in which the opening portion 146d opens and the motor chamber Sa communicate with each other through the opening 120b of the beam portion 120. The oil OL warmed by the stator core of the motor 2, which is a heat source, is discharged from the opening 120b (outlet) and stored in the oil storage portion OP of the second gear chamber Sb2. Therefore, the opening portion 146d provided in the second gear chamber Sb2 at a position close to the stator core 25 easily sucks the oil OL warmed by the stator core 25. At a low temperature, the viscosity of the oil OL tends to increase, but by disposing the opening portion 146d near the motor 2, the suction performance of the oil pump 95 can be improved even at a low temperature during which the viscosity of the oil OL tends to increase.

Furthermore, in Modification 2, by integrating the strainer with the strainer chamber SR, the size of the strainer chamber SR can be reduced, and the layout of the power transmission device 1 can be improved. Note that the strainer chamber SR may have the same volume as that in the embodiment, thereby increasing the volume of the strainer.

As described above, the power transmission device 1 according to Modification 2 has the following configuration.

(9) The pump inlet is provided as the opening portion 146d on the support wall portion 146, which is the inner wall of the strainer chamber SR (second chamber).

Since the pump inlet itself for sucking the oil OL occupies a small area, by providing the pump inlet on the support wall portion 146 that is the inner wall of the strainer chamber SR, the degree of freedom in the layout of the pump inlet can be improved.

By disposing the pump inlet on the inner wall of the strainer chamber SR, layout options are increased as described below, so that the degree of freedom in the layout can be improved.

(A) Parts (the oil pump and/or the strainer) connected downstream of the pump inlet can be disposed outside the strainer chamber SR.

For example, as in Modification 2, the oil pump 95 can be disposed outside the strainer chamber SR.

Furthermore, for example, the filter F may not be disposed inside the strainer chamber SR, and the entire strainer chamber SR may function as the suction port of the strainer. In this case, a main body portion of the strainer in which the filter F is disposed may be separately provided outside the strainer chamber SR.

(B) Parts (the pump and/or the strainer) connected downstream of the pump inlet can be disposed in the strainer chamber SR at a position away from the pump inlet.

For example, by applying the configuration in FIGS. 20 and 21, the oil pump 95 may be disposed in the strainer chamber SR, and the suction port 95a of the oil pump 95 and the opening portion 146d may be directly connected to each other by the pipe PI.

Modification 3

Although an example in which the strainer chamber SR is provided below the gear chamber Sb is described in the embodiment, the present invention is not limited thereto, and the position of the strainer chamber SR can be changed as appropriate.

FIG. 24 to FIG. 27 are schematic diagrams showing the layout of the strainer chamber SR according to Modification 3.

FIG. 24 to FIG. 27 schematically show the disposition relation between the main body box 10 and the strainer chamber SR, and the detailed internal configuration is omitted, but the configuration of the above-described embodiment and modifications can be applied.

Figure 24:
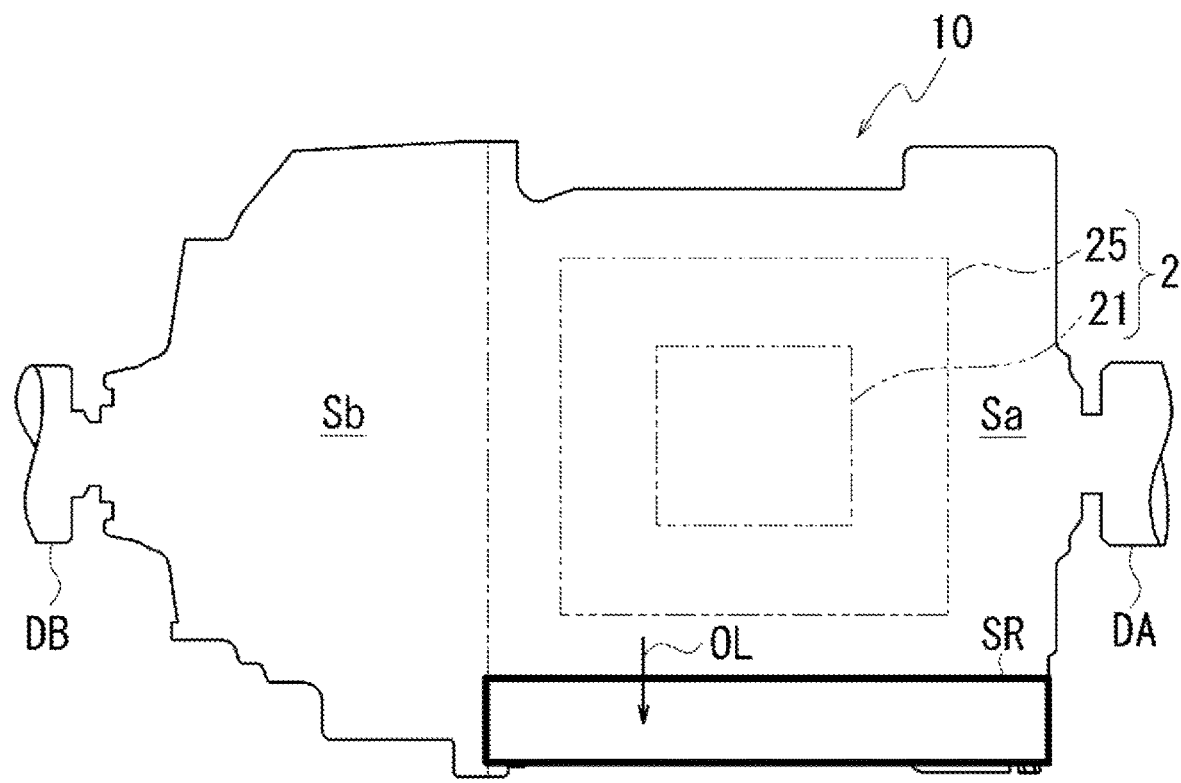
FIG. 24 is a schematic diagram showing layout of a strainer chamber according to Modification 3.

As shown in FIG. 24, the strainer chamber SR can be disposed below the motor chamber Sa.

Figure 25:
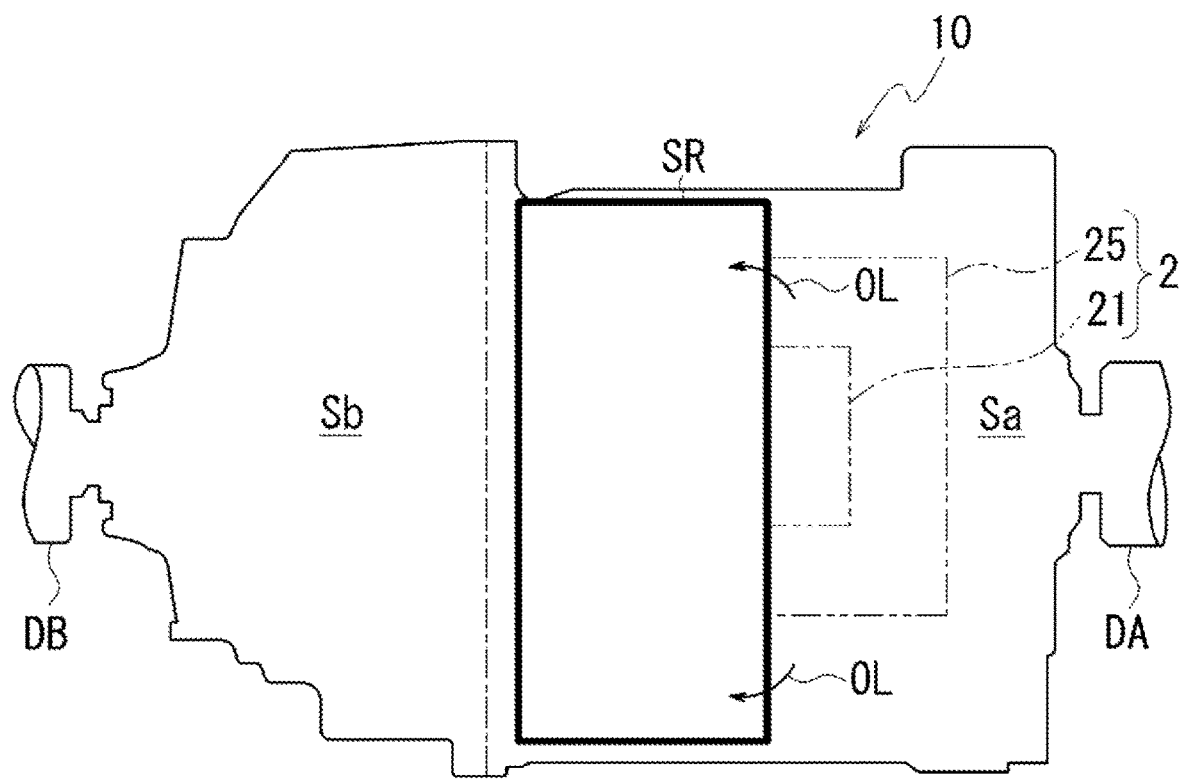
FIG. 25 is a schematic diagram showing layout of the strainer chamber according to Modification 3.

As shown in FIG. 25, the strainer chamber SR can be disposed on a lateral side of the motor chamber Sa.

In the configurations shown in FIGS. 24 and 25, the strainer chamber SR (second chamber) is disposed at a position overlapping the motor 2 in the radial direction. Although illustration is omitted, the strainer chamber SR and the motor chamber Sa are connected via an oil passage. As indicated by arrows in the drawing, the oil OL in the motor chamber Sa flows into the strainer chamber SR. For example, the oil passage may be an opening portion that is provided on the inner wall of the main body box 10 and allows the strainer chamber SR and the motor chamber Sa to communicate with each other, as in the embodiment. As in the example of FIG. 26, the oil passages may be provided in both the upper and lower portions of the motor chamber Sa to facilitate the inflow of the oil OL.

The oil OL in the motor chamber Sa is warmed by the stator core 25 of the motor 2 serving as a heat source. The oil OL warmed in the motor chamber Sa flows into the strainer chamber SR. As a result, even at a low temperature during which the viscosity of the oil OL is high, it is possible to improve the oil suction performance of the suction port (pump inlet) of the strainer.

Figure 26:
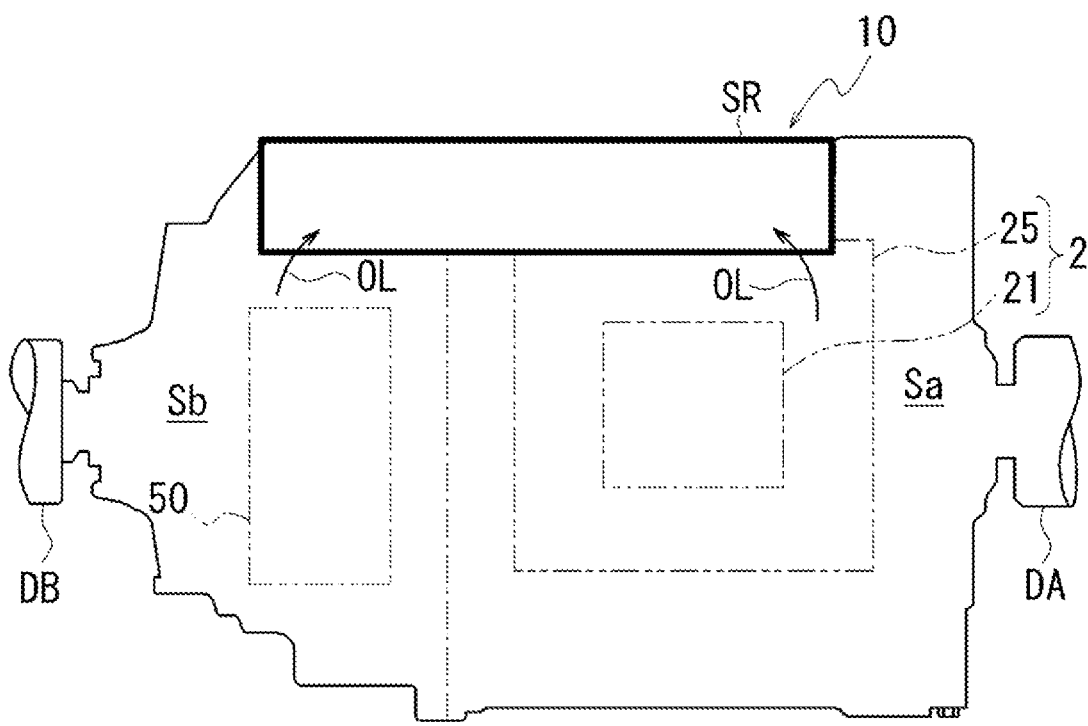
FIG. 26 is a schematic diagram showing layout of the strainer chamber according to Modification 3.

As shown in FIG. 26, the strainer chamber SR can be provided above the main body box 10.

Although the range in which the strainer chamber SR is provided is not limited, for example, the strainer chamber SR may be provided so as to extend in the rotation axis X direction over the motor chamber Sa and the gear chamber Sb. Alternatively, the strainer chamber SR may be provided above either the motor chamber Sa or the gear chamber Sb.

In this case, the oil OL that is scraped up by the rotation of the differential case 50 or the motor 2 may be introduced into the strainer chamber SR. For example, an oil passage or the like may be provided so that the oil OL that flows into the oil catch portion 15 (see FIG. 9) by the scraping up of the differential case 50 is introduced into the strainer chamber SR.

In FIGS. 25 and 26, the strainer chamber SR (second chamber) overlaps the motor chamber Sa in the radial direction of the rotation axis X by disposing the strainer chamber SR on a lateral side of or above the motor chamber Sa. As a result, it is possible to reduce the protrusion of the strainer chamber SR in the rotation axis X direction from the motor chamber Sa, thereby improving the layout.

Note that the strainer chamber SR may be disposed on a lateral side of or above the gear chamber Sb. In this case, the strainer chamber SR (second chamber) overlaps the gear chamber Sb (first chamber) in the radial direction of the rotation axis X, as in the embodiment. As a result, it is possible to reduce the protrusion of the strainer chamber SR in the rotation axis X direction from the gear chamber Sb, thereby improving the layout.

Figure 27:
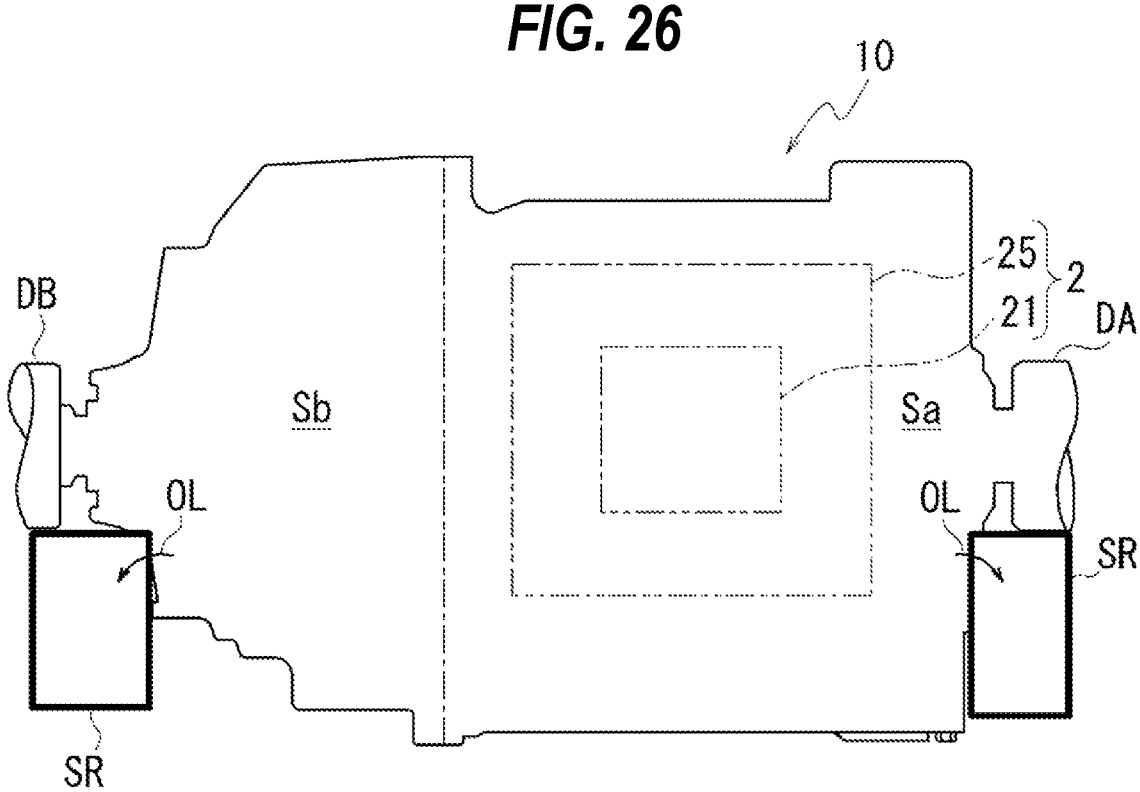
FIG. 27 is a schematic diagram showing layout of the strainer chamber according to Modification 3.

As shown in FIG. 27, the strainer chamber SR can be provided on the outer periphery of each of the drive shafts DA and DB (the outer side in the radial direction of the rotation axis X). FIG. 27 shows an example in which the strainer chamber SR is provided on the outer peripheries of both the drive shafts DA and DB. Although not illustrated, the strainer chamber SR on the drive shaft DA side is connected to the motor chamber Sa by an oil passage, and the oil OL in the motor chamber Sa flows into the strainer chamber SR on the drive shaft DA. The strainer chamber SR on the drive shaft DB side is connected to the gear chamber Sb by an oil passage, and the oil OL in the gear chamber Sb flows into the strainer chamber SR on the drive shaft DB side.

By providing the strainer chamber SR on two positions, the volume of the strainer can be increased, but it is also possible to provide the strainer chamber SR on either one position. By providing the strainer chamber SR around the drive shafts DA and DB, the strainer chamber SR (second chamber) overlaps the gear chamber Sb (first chamber) in the rotation axis X direction (axial direction). As a result, it is possible to prevent the strainer chamber SR from protruding outward in the radial direction from the gear chamber Sb, thereby improving the layout.

As described above, an example of the power transmission device 1 of Modification 3 has the following configuration.

(10) The strainer chamber SR (second chamber) overlaps the motor 2 in the radial direction.

As shown in FIG. 27, by disposing the strainer chamber SR (second chamber) at a position close to the motor 2 serving as a heat source, the oil OL in the strainer chamber SR can be warmed by the heat of the motor 2 even at a low temperature during which the viscosity of the oil OL is high. As a result, it is possible to improve the oil suction performance of the pump inlet (for example, the suction port of the strainer) disposed in the strainer chamber SR even at a low temperature.

Other Modifications

Although an example using an electric oil pump as the oil pump 95 is described in the embodiment, a mechanical oil pump may be used. For example, the mechanical oil pump may be disposed in the motor chamber Sa of the main body box 10 and driven using the rotation of the motor 2.

Although the embodiment of the present invention has been described above, the above embodiment merely exemplifies one application example of the present invention, and does not intend to limit the technical scope of the present invention to the specific configuration of the above embodiment.

The present application claims a priority of Japanese Patent Application No. 2020-169856 filed with the Japan Patent Office on Oct. 7, 2020, all the contents of which are hereby incorporated by reference.

REFERENCE SIGNS LIST

1: power transmission device
10: main body box
2: motor
4: planetary reduction gear (gear mechanism)
5: differential mechanism (gear mechanism)
90: strainer
91: main body portion
92: suction port (pump inlet)
95: oil pump (pump)
DA: drive shaft (drive shaft)
SR: strainer chamber (second chamber)
Sb: gear chamber (first chamber)

The invention claimed is:

1. A power transmission device, comprising:
a motor;
a gear mechanism connected downstream of the motor;
a strainer including a main body portion and a pump inlet connected to the main body portion;
a pump that sucks oil through the pump inlet; and
a box that includes
 a first chamber accommodating the gear mechanism, the first chamber including an oil storage portion and
 a second chamber provided with the pump inlet and the main body portion, wherein
the second chamber is offset from the motor when viewed from a radial direction, and the main body portion overlaps the first chamber when viewed from the radial direction, a support wall portion surrounding the gear mechanism being located between the main body portion and the first chamber.

2. The power transmission device according to claim 1, further comprising:
a drive shaft connected downstream of the gear mechanism and disposed passing through an inner periphery of the motor.

3. The power transmission device according to claim 1, wherein
the box is provided with an opening portion that allows the first chamber and the second chamber to communicate with each other.

4. The power transmission device according to claim 1, wherein
the pump inlet serves as a suction port of the strainer, and
at least a part of the main body portion of the strainer is disposed in the second chamber.

5. The power transmission device according to claim 1, wherein
the pump inlet is provided on an inner wall of the second chamber.

6. The power transmission device according to claim 1, wherein
the second chamber is positioned below the first chamber.

7. The power transmission device according to claim 1, wherein
the gear mechanism includes a planetary reduction gear.

8. A power transmission device, comprising:
a motor;
a gear mechanism connected downstream of the motor;
a strainer including a main body portion and a pump inlet connected to the main body portion;
a pump that sucks oil through the pump inlet; and
a box that includes a first chamber accommodating the gear mechanism, a second chamber provided with the pump inlet and the main body portion, and a third chamber accommodating the motor, wherein
the second chamber is offset from the third chamber when viewed from a radial direction, and
in an axial direction, between the second chamber and one of the first chamber and the third chamber, the other of the first chamber and the third chamber is provided.

9. The power transmission device according to claim 8, further comprising:
a drive shaft connected downstream of the gear mechanism and disposed passing through an inner periphery of the motor.

10. The power transmission device according to claim 8, wherein
the box is provided with an opening portion that allows the first chamber and the second chamber to communicate with each other.

11. The power transmission device according to claim 8, wherein
the pump inlet serves as a suction port of the strainer, and
at least a part of the main body portion of the strainer is disposed in the second chamber.

12. The power transmission device according to claim 8, wherein
the pump inlet is provided on an inner wall of the second chamber.

13. The power transmission device according to claim 8, wherein
the second chamber is positioned below the first chamber.

14. The power transmission device according to claim 8, wherein
the gear mechanism includes a planetary reduction gear.

* * * * *